United States Patent
Sabareesh et al.

(10) Patent No.: US 12,531,830 B2
(45) Date of Patent: Jan. 20, 2026

(54) METHOD AND ELECTRONIC DEVICE FOR DEVICE IP STATUS CHECKING AND CONNECTION ORCHESTRATION

(71) Applicant: SAMSUNG ELECTRONICS CO., LTD., Suwon-si (KR)

(72) Inventors: Dronamraju Siva Sabareesh, Bangalore (IN); Srihari Kuncha, Bangalore (IN); Sarvesh Sharad Harale, Bangalore (IN); Shourya Tomar, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 282 days.

(21) Appl. No.: 17/954,684

(22) Filed: Sep. 28, 2022

(65) Prior Publication Data

US 2023/0094359 A1 Mar. 30, 2023

Related U.S. Application Data

(63) Continuation of application No. PCT/KR2022/014272, filed on Sep. 23, 2022.

(30) Foreign Application Priority Data

Sep. 29, 2021 (IN) .............................. 202141044299
Sep. 15, 2022 (IN) .............................. 202141044299

(51) Int. Cl.
*H04L 61/251* (2022.01)
*H04L 61/103* (2022.01)
*H04L 61/5053* (2022.01)

(52) U.S. Cl.
CPC .......... *H04L 61/251* (2013.01); *H04L 61/103* (2013.01); *H04L 61/5053* (2022.05)

(58) Field of Classification Search
CPC .. H04L 61/251; H04L 61/5053; H04L 61/103
See application file for complete search history.

(56) References Cited

U.S. PATENT DOCUMENTS 8,037,530 B1 * 10/2011 Fink .................... H04L 61/2539
713/153
10,164,934 B1 12/2018 Bittfield et al.
(Continued)

FOREIGN PATENT DOCUMENTS

| CN | 105792174 | 7/2016 |
|----|-----------|--------|
| EP | 3 078 186 | 8/2018 |
| EP | 3668006   | 6/2020 |

OTHER PUBLICATIONS

Indian Examination Report issued Sep. 27, 2023 in corresponding Indian Patent Application No. 202141044299.
(Continued)

*Primary Examiner* — Joseph L Greene
(74) *Attorney, Agent, or Firm* — NIXON & VANDERHYE P.C.

(57) ABSTRACT

Embodiments herein disclose a method for Device IP Status Checking and Connection Orchestration (DISCCO) by a first electronic device. The method may include receiving a version(s) of an IP address from a backhaul server. The method may include determining an IP stack capability status of a second electronic device using a network protocol(s), where the IP stack capability status indicates whether the received version(s) of the IP address is supported by the second electronic device and the received version(s) of the IP address is enabled on the second electronic device. The method may include storing the IP stack capability status of the second electronic device into a host status database of the first electronic device. The method may include orchestrating the received version(s) of the IP address with the
(Continued)

backhaul server and/or the second electronic device based on the stored IP stack capability status.

15 Claims, 17 Drawing Sheets

(56) References Cited

U.S. PATENT DOCUMENTS

| | | |
|---|---|---|
| 2004/0004940 A1 | 1/2004 | Abrol et al. |
| 2009/0156209 A1 | 6/2009 | Franklin et al. |
| 2011/0225632 A1* | 9/2011 | Ropolyi ............... H04W 12/033 726/4 |
| 2011/0242975 A1 | 10/2011 | Zhao et al. |
| 2011/0305143 A1* | 12/2011 | Gray ..................... H04L 45/026 370/242 |
| 2012/0207163 A1* | 8/2012 | Schrum ............... H04L 12/5692 370/392 |
| 2013/0294284 A1* | 11/2013 | Popa ................... H04L 61/4511 370/254 |
| 2014/0328317 A1* | 11/2014 | Park .................... H04L 61/5007 370/331 |
| 2014/0341138 A1 | 11/2014 | Roeland et al. |
| 2015/0207775 A1* | 7/2015 | Zou ....................... H04L 61/251 709/221 |
| 2016/0073283 A1 | 3/2016 | Grayson et al. |
| 2016/0088662 A1 | 3/2016 | Seman et al. |
| 2016/0182691 A1 | 6/2016 | Perreault et al. |
| 2018/0092017 A1* | 3/2018 | Freda ................... H04W 76/23 |
| 2018/0338274 A1* | 11/2018 | Gallagher ............. H04W 48/02 |
| 2019/0289666 A1 | 9/2019 | Backman et al. |
| 2020/0221376 A1 | 7/2020 | Li et al. |
| 2021/0219221 A1 | 7/2021 | Li et al. |
| 2022/0052876 A1* | 2/2022 | Qu ....................... H04L 12/4641 |

OTHER PUBLICATIONS

Search Report and Written Opinion dated Jan. 6, 2023 issued in International Patent Application No. PCT/KR2022/014272.

* cited by examiner

METHOD AND ELECTRONIC DEVICE FOR DEVICE IP STATUS CHECKING AND CONNECTION ORCHESTRATION

CROSS-REFERENCE TO RELATED APPLICATIONS

This application is a continuation of International Application No. PCT/KR2022/014272, designating the United States, filed on Sep. 23, 2022, in the Korean Intellectual Property Receiving Office and claiming priority to Indian Provisional Patent Application No. 202141044299, filed on Sep. 29, 2021, in the Indian Patent Office, and to Indian Complete Patent Application No. 202141044299, filed on Sep. 15, 2022, in the Indian Patent Office, the disclosures of each of which are incorporated by reference herein in their entireties.

BACKGROUND

Field

The disclosure relates to an electronic device, for example to a method and electronic device of device Internet Protocol (IP) status checking and connection orchestration.

Description of Related Art

In general, Fifth Generation (5G) cellular networks promise up to 100 times faster speeds than Fourth Generation (4G) cellular networks and provide new possibilities for both individuals and businesses. International Telecommunication Union (ITU) has defined three 5G cellular network usage scenarios. For example, an Enhanced Mobile Broadband (eMBB) for applications requiring high bandwidth, an Ultra Reliable Low Latency Communication (URLLC) for latency sensitive applications, and a Massive Machine Type Communication (mMTC) for information exchange between machines with minimal human intervention. These categories establish a path for a wide range of 5G cellular network-based applications. The demand for 5G cellular routers is increasing in tandem with the expansion of 5G cellular networks. The 5G cellular routers enable users to connect to an internet via cellular networks, allowing the 5G cellular routers to become portable and thus increasing user productivity, mobility, and convenience. In addition, 5G cellular networks consumes more power in connected devices (e.g., mobile devices, 5G cellular routers) and has a smaller coverage area than 4G cellular networks. These factors have prompted users to install the 5G cellular routers in their homes and businesses.

A majority of routers (e.g., 5G cellular routers) serve as internet Access Point (AP) devices (e.g., Consumer Premises Equipment (CPE)) for host devices (e.g., mobile devices). A Packet Data Network (PDN) assigns global Internet Protocol version 4 (IPv4) and Internet Protocol version 6 (IPv6) addresses to the AP device, which creates a private network for the host devices. The PDN is a network that provides data services, such as the Internet. These AP devices then use a Dynamic Host Configuration Protocol (DHCP) for IPv4, a DHCPv6, and a Stateless Address Auto Configuration (SLAAC) for IPv6 to provide the global IPv4/IPv6 addresses and other network parameters to the host devices in the private network.

In the existing system, there are some scenarios where the host devices connected to the AP device may not support either IPv4 or IPv6 addresses, or either IPv4 or IPv6 addresses may be manually disabled by the users in the host devices. Because the AP device of the existing system is unaware of the host IP status (IP stack capability), the AP device keeps the global IPv4/IPv6 addresses obtained from the PDN even if the global IPv4/IPv6 addresses will not be used. As a result, the AP device wastes a memory when storing IP-related data and running IP address standard operating procedures of unusable and/or unsupported IPv4/IPv6 addresses. The AP device wastes a Central Processing Unit (CPU) usage/computing resources when running any IP address management activities of unusable and/or unsupported IPv4/IPv6 addresses. The AP device wastes network resources because of an overhead of storing unusable and/or unsupported IPv4/IPv6 addresses information, Domain Name System (DNS) server information, and running the IP address management activities of unusable and/or unsupported IPv4/IPv6 addresses. Exchange of networking messages between the AP device, the PDN, and the host devices increases because the AP device of the existing system is unaware of the host IP status, which increases a load on the AP device and decreases an operational efficiency of the AP device.

Thus, it is desired to address the above-mentioned disadvantages or other shortcomings or at least provide a useful alternative for device Internet Protocol (IP) status checker and connection orchestrator.

SUMMARY

Embodiments of the disclosure provide a method for device IP status checking and connection orchestration by determining, by a first electronic device (e.g., Consumer Premises Equipment (CPE)), an IP stack capability status of a second electronic device (e.g. mobile device) using a network protocol(s) (e.g., An Address Resolution Protocol (ARP)). The IP stack capability status indicates whether a version of the IP address (e.g., an Internet Protocol version 4 (IPv4) and an Internet Protocol version 6 (IPv6)) is supported by the second electronic device and the version of the IP address is enabled on the second electronic device. The first electronic device handles IP management, releases unusable and/or unsupported IPv4/IPv6 addresses, and acquires usable and/or supported IPv4/IPv6 addresses based on the IP stack capability status. As a result, the first electronic device reduces memory consumption, Central Processing Unit (CPU) usage, power consumption, network resources usage (e.g., fewer DNS queries), network load (e.g., Network Address Translation (NAT)), which improves an operational efficiency of the first electronic device and user experience.

Accordingly, example embodiments herein disclose a method for device IP status checking and connection orchestration by a first electronic device. The method may comprise receiving a version(s) of an Internet Protocol (IP) address from a backhaul server. The method may comprise determining an IP stack capability status of a second electronic device(s) using a network protocol(s). The method may comprise storing the IP stack capability status of the second electronic device(s). The method may comprise orchestrating the received version(s) of the IP address with the backhaul server and/or the second electronic device(s) based on the stored IP stack capability status.

In an example embodiment, the method may further include: terminating, by the first electronic device, IP management associated with the received version(s) of the IP address based on the received version(s) of the IP address not being supported by the second electronic device(s) and the received version(s) of the IP address is not enabled on the second electronic device.

In an example embodiment, orchestrating, by the first electronic device, the received version(s) of the IP address with of the backhaul server and the second electronic device(s) based on the stored IP stack capability status may include: releasing the received version(s) of the IP address and sending the released version of the IP address to the backhaul server based on the received version(s) of the IP address not being supported by the second electronic device(s) and the received version(s) of the IP address not being enabled on the second electronic device; or acquiring the received version(s) of the IP address from the backhaul server to communicate with the second electronic device(s) based on the received version(s) of the IP address being supported by the second electronic device(s) and the received version(s) of the IP address being enabled on the second electronic device.

In an example embodiment, the version(s) of the IP address may include at least one of an Internet Protocol version 4 (IPv4) address and an Internet Protocol version 6 (IPv6) address and the host status database stores the IPv4 address, the IPv6 address, link layer addresses, a v4 retry count, a v6 retry count, a network v4 status, and a network v6 status.

In an example embodiment, the network protocol may includes at least one of an Address Resolution Protocol (ARP) and a Dynamic Host Configuration Protocol (DHCP) for the IPv4 address, a Neighbour Discovery Protocol (NDP), and a Dynamic Host Configuration Protocol version 6 (DHCPv6).

In an example embodiment, determining the IP stack capability status of the second electronic device(s) using the network protocol may include: sending, by the first electronic device, a packet associated with the IPv4 address to the second electronic device; initiating, by the first electronic device, the v4 retry count in response to sending the packet to the second electronic device; initiating, by the first electronic device, a timer in response to sending the packet to the second electronic device; determining, by the first electronic device, whether a response of the packet is received from the second electronic device(s) before the timer expires and whether the v4 retry count is within a threshold limit (e.g., 3; detecting that the IPv4 address is supported by the second electronic device(s) and the IPv4 address is enabled on at the second electronic device(s) in response to determining that the response of the packet is received from the second electronic device(s) before the timer expires and the v4 retry count is within the threshold limit; or detecting that the IPv4 address is not supported by the second electronic device(s) and the IPv4 address is not enabled on at the second electronic device(s) in response to determining that the response of the packet is received from the second electronic device(s) after the timer expires and the v4 retry count crosses the threshold limit; or detecting that the IPv4 address is not supported by the second electronic device(s) and the IPv4 address is not enabled on at the second electronic device(s) in response to determining that the response of the packet is not received from the second electronic device(s) before the timer expires and the v4 retry count crosses the threshold limit.

In an example embodiment, orchestrating the received version(s) of the IP address with the backhaul server and/or the second electronic device(s) may include: receiving, by the first electronic device, the packet associated with the IPv4 address from the second electronic device; receiving, by the first electronic device, an IPv4 address disable indication from the second electronic device, where the IPv4 address is manually disabled by a user of the second electronic device; releasing, by the first electronic device, the IPv4 address upon receiving the IPv4 address disable indication; and sending, by the first electronic device, the released IPv4 address to the backhaul server to terminate IP management associated with the released IPv4 address.

In an example embodiment, determining the IP stack capability status of the second electronic device(s) using the network protocol may include: sending, by the first electronic device, a packet associated with the IPv6 address to the second electronic device; initiating, by the first electronic device, the v6 retry count in response to sending the packet to the second electronic device; initiating, by the first electronic device, a timer in response to sending the packet to the second electronic device; determining, by the first electronic device, whether a response of the packet is received from the second electronic device(s) before the timer expires and whether the v6 retry count is within a threshold limit (e.g., 3); includes detecting that the IPv6 address is supported by the second electronic device(s) and the IPv6 address is enabled on at the second electronic device(s) in response to determining that the response of the packet is received from the second electronic device(s) before the timer expires and the v6 retry count is within the threshold limit; or detecting that the IPv6 address is not supported by the second electronic device(s) and the IPv6 address is not enabled on at the second electronic device(s) in response to determining that the response of the packet is received from the second electronic device(s) after the timer expires and the v6 retry count crosses the threshold limit; or detecting that the IPv6 address is not supported by the second electronic device(s) and the IPv6 address is not enabled on at the second electronic device(s) in response to determining that the response of the packet is not received from the second electronic device(s) before the timer expires and the v6 retry count crosses the threshold limit.

In an example embodiment, orchestrating the received version(s) of the IP address with the backhaul server and/or the second electronic device(s) may include: receiving, by the first electronic device, a packet associated with the IPv6 address from the second electronic device; receiving, by the first electronic device, an IPv6 address disable indication from the second electronic device, where the IPv6 address is manually disabled by the user of the second electronic device; releasing, by the first electronic device, the IPv6 address upon receiving the IPv6 address disable indication; and sending, by the first electronic device, the released IPv6 address to the backhaul server to terminate IP management associated with the released IPv6 address.

In an example embodiment, the method may further include: receiving, by the first electronic device, an IPv4 address enable indication from the second electronic device, where the IPv4 address is manually enabled by the user of the second electronic device; sending, by the first electronic device, an IPv4 address allocation request to the backhaul server upon receiving the IPv4 address enable indication; receiving, by the first electronic device, the IPv4 address from the backhaul server; and allocating, by the first electronic device, the received IPv4 address to the second electronic device.

In an example embodiment, the method may further include: receiving, by the first electronic device, an IPv6 address enable indication from the second electronic device, where the IPv6 address is manually enabled by the user of the second electronic device; sending, by the first electronic device, an IPv6 address allocation request to the backhaul server upon receiving the IPv6 address enable indication; and receiving, by the first electronic device, the IPv6 address from the backhaul server. Further, the method includes allocating, by the first electronic device, the received IPv6 address to the second electronic device.

Accordingly, various example embodiments herein provide the first electronic device for device internet protocol, IP, status checking and connection orchestration. The first electronic device may comprise a memory; and at least one processor coupled to the memory. The at least one processor may be configured to receive at least one version of an Internet Protocol, IP, address from a backhaul server. The at least one processor may be configured to determine an IP stack capability status of at least one second electronic device using at least one network protocol. The at least one processor may be configured to store the IP stack capability status of the at least one second electronic device. The at least one processor may be configured to orchestrate the at least one received version of the IP address with at least one of the backhaul server and the at least one second electronic device based on the stored IP stack capability status.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein w, and the embodiments herein include all such modifications.

BRIEF DESCRIPTION OF THE DRAWINGS

The disclosure is illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which.

DETAILED DESCRIPTION

The various example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the description with unnecessary detail. The various example embodiments described herein are not necessarily mutually exclusive, as various embodiments may be combined with one or more other embodiments to form new embodiments. The term "or" as used herein, refers to a non-exclusive or, unless otherwise indicated. The examples should not be construed as limiting the scope of the embodiments herein.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the various example embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Figure 1A:
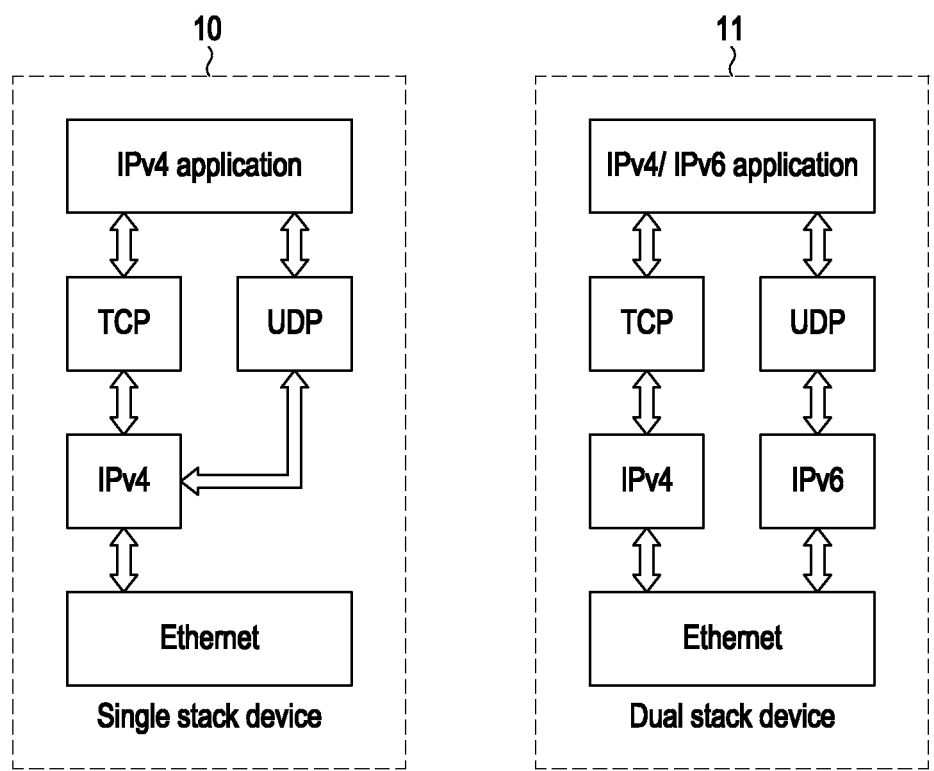
FIG. 1A is a diagram illustrating an Internet Protocol (IP) stack capability of an electronic device, according to the prior art.

FIG. 1A is a diagram illustrating an Internet Protocol (IP) stack capability of an electronic device (e.g., mobile device), according to the prior art.

In general, the IP stack capability refers to a version of IP supported by the electronic device in their network stack. Single-stack architecture (10) includes various layers such as an IPv4 application layer, a transport layer (Transmission Control Protocol (TCP)/User Datagram Protocol (UDP)), an IPv4 network/data link layer, and a physical layer (Ethernet). Single-stack architecture (10) may refer, for example, to IPv4 protocol stack existing on terminal devices and network nodes. Single-stack architecture (10) can receive, process, and forward data for IPv4 nodes. Dual-stack architecture (11) includes various layers such as an IPv4/IPv6 application layer, a transport layer (TCP/UDP), an IPv4 network/data link layer, an IPv6 network/data layer, and a physical layer (Ethernet). Dual-stack architecture (11) may refer, for example, to IPv4 and IPv6 protocol stacks existing simultaneously on terminal devices and network nodes. Dual-stack architecture (11) can receive, process, and forward data for both IPv4 and IPv6 nodes separately without making any change to a packet header.

The interface of the electronic device configured as a dual-stack can have IPv6-only or IPv4-only or both addresses. The electronic device (e.g., router) contains two routing tables, one for IPv4 addresses and one for IPv6 addresses. When a dual-stack node/electronic device receives a data segment, the electronic device checks the packet header at the link layer of a TCP/IP protocol stack. If the packet header is IPv4, the packet is handled by the IPv4 protocol stack. If the packet header is IPv6, the packet is handled by the IPv6 protocol stack. Dual-stack architecture (11) eliminates a need for any tunnelling or NAT mechanisms for conversion of IP from one version to another.

Figure 1B:
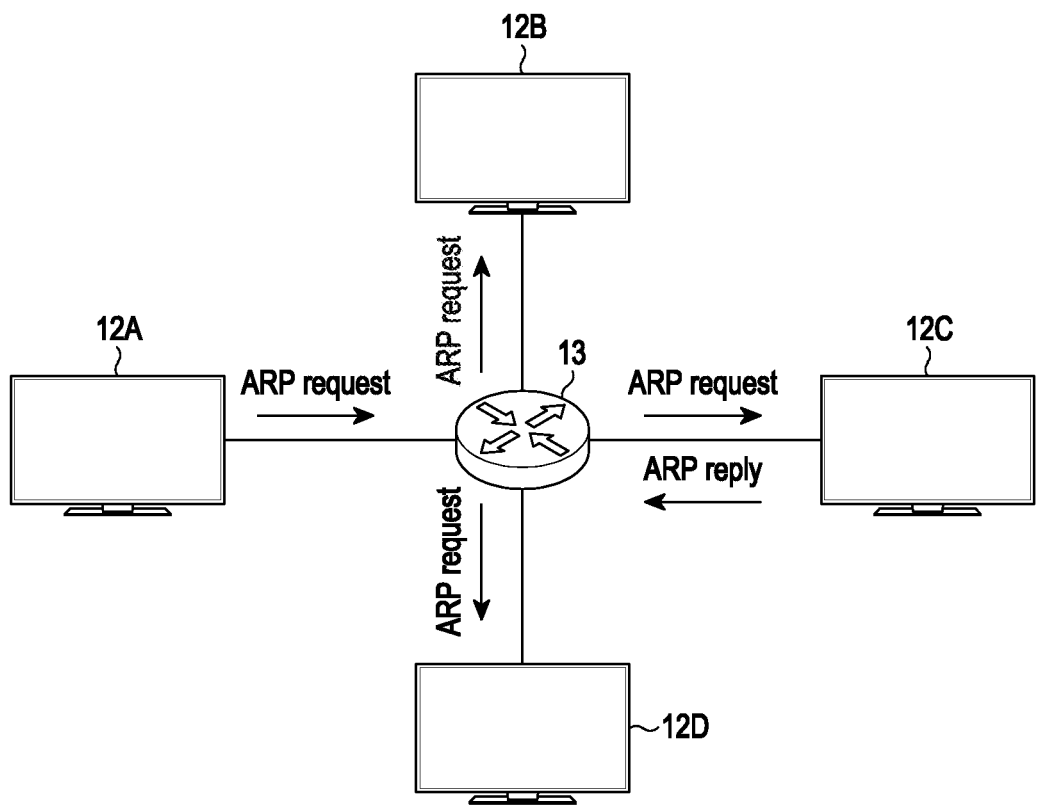
FIG. 1B is a diagram illustrating an example scenario illustrating an Address Resolution Protocol (ARP) procedure to establish communication between a router, a host electronic device, and other electronic devices, according to the prior art.

FIG. 1B is a diagram illustrating an example scenario illustrating an Address Resolution Protocol (ARP) procedure to establish communication between a router (13), a host electronic device (12A), and other electronic devices (12B, 12C, and 12D), according to the prior art.

The ARP is a protocol that is used associated with IPv4 to map a temporary IP address to a permanent physical machine address (MAC address). It is a part of a standard TCP/IP protocol stack that operates at the link layer of the TCP/IP protocol stack. The ARP protocol is required due to different lengths of IP and MAC addresses and a need to uniquely identify each electronic device (e.g., 12B, 12C, 12D, etc.).

When the host electronic device (12A) needs to know physical addresses of another electronic device (12B, 12C, or 12D) in an IPv4 network, the host electronic device (12A) broadcasts an ARP request packet on the IPv4 network. A responding electronic device (12B, 12C, and 12D) sends an ARP reply packet back to the host electronic device (12A). Each device also keeps ARP caches with the most recent IP address-to-physical-address (MAC address) mappings. When the host electronic device (12A) requests the MAC address to send data to other IPv4-connected electronic devices (12B, 12C, and 12D), the host electronic device (12A) checks the ARP cache to see if an IP-to-MAC-address connection has already been completed. If the IP-to-MAC-address connection exists, then a new request is unnecessary.

Figure 1C:
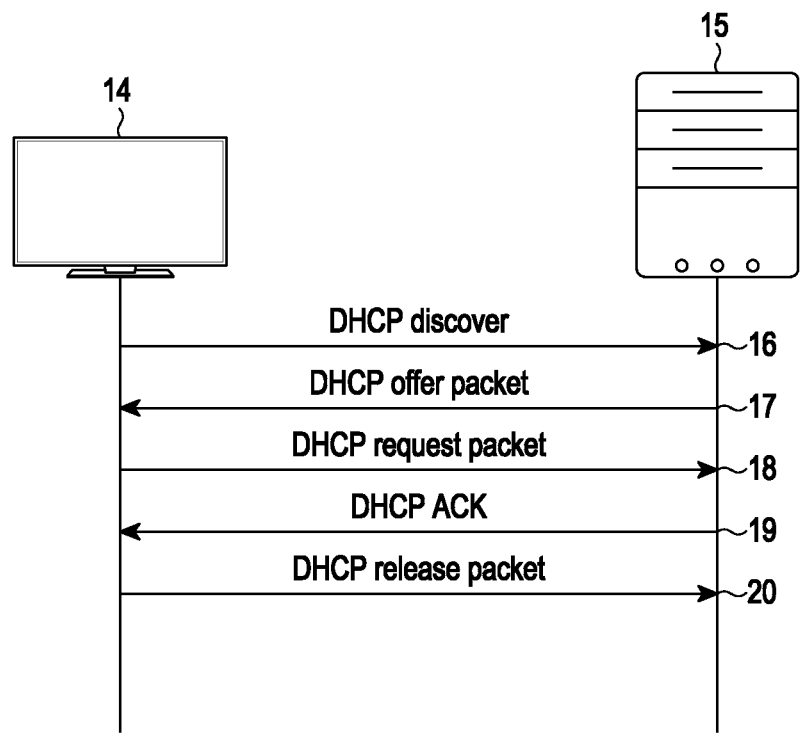
FIG. 1C is a signal flow diagram illustrating an example scenario illustrating a Dynamic Host Configuration Protocol (DHCP) procedure to establish communication between a client electronic device and a DHCP server, according to the prior art.

FIG. 1C is a signal flow diagram illustrating an example scenario illustrating a Dynamic Host Configuration Protocol (DHCP) procedure to establish communication between a client electronic device (14) (e.g., laptop) and a DHCP server (15), according to the prior art.

The DHCP protocol is a client/server protocol that automatically assigns an IP address and other configuration information to an Internet Protocol (IP) client. The DHCP protocol is a part of the standard TCP/IP protocol stack operating at an application layer of a TCP/IP protocol stack. The client electronic device (14) to get DHCP information broadcasts a DHCP discover (16) on a network/towards the DHCP server (15). Any DHCP server (15) running on the network/towards the client electronic device (14) responds with a DHCP offer packet (17) containing potential configuration parameters. If the client electronic device (14) accepts offered parameters (potential configuration parameters), the client electronic device (14) sends a DHCP request packet (18) indicating the allocation of offered parameters. Finally, the DHCP server (15) allocates parameters and sends a DHCP ack (19) to the client electronic device (14). If the client electronic device (14) intends to release the allocated parameters, the client electronic device (14) sends a DHCP release packet (20) to the DHCP server (15). One advantage of the DHCP protocol is that the DHCP protocol reduces errors caused by manual allocation, such as typographical errors, and addresses conflicts.

Figure 1D:
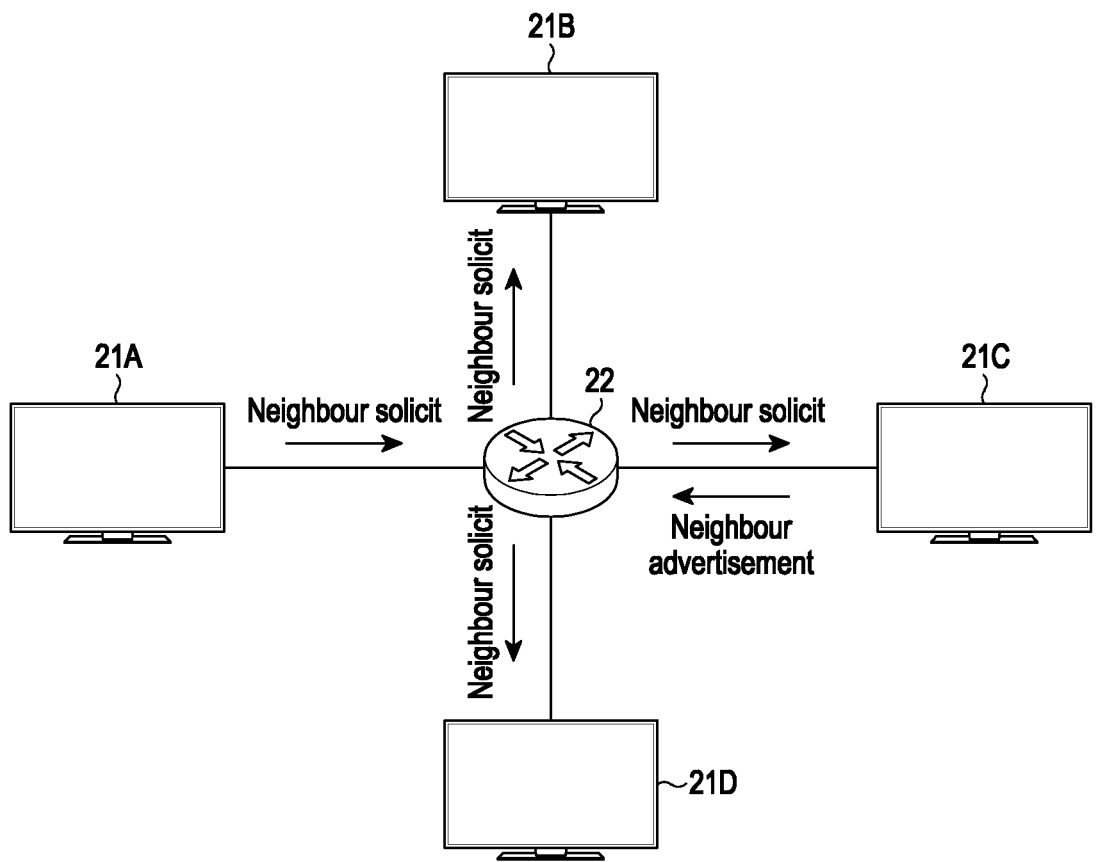
FIG. 1D is a diagram illustrating an example scenario illustrating a Neighbour Discovery Protocol (NDP) procedure to establish communication between the router, the host electronic device, and the other electronic devices, according to the prior art.

FIG. 1D is a diagram illustrating an example scenario illustrating a Neighbour Discovery Protocol (NDP) procedure to establish communication between a router (22), a host electronic device (21A), and the other electronic devices (21B, 21C, and 21D), according to the prior art.

The NDP is a protocol of a TCP/IP suite used with the IPv6. Like the ARP, the NDP also operates at the link layer of the TCP/IP protocol stack. The NDP combines functionalities of the ARP, an Internet Control Message Protocol (ICMP), and a Router Discovery for the IPv6. The NDP works in a similar way as the ARP where the host electronic device (21A) broadcasts Router Solicitation (RS) or Neighbour Solicitation (NS) on a link. The intended recipient (e.g., other electronic devices (21C) responds by sending a Router Advertisement (RA) or Neighbour Advertisement (NA) indicating its presence on the same link. Any router (22) present on the link periodically broadcasts the Router Advertisements for all host devices to refresh their IPv6 address using a prefix provided in those packets.

Figure 1E:
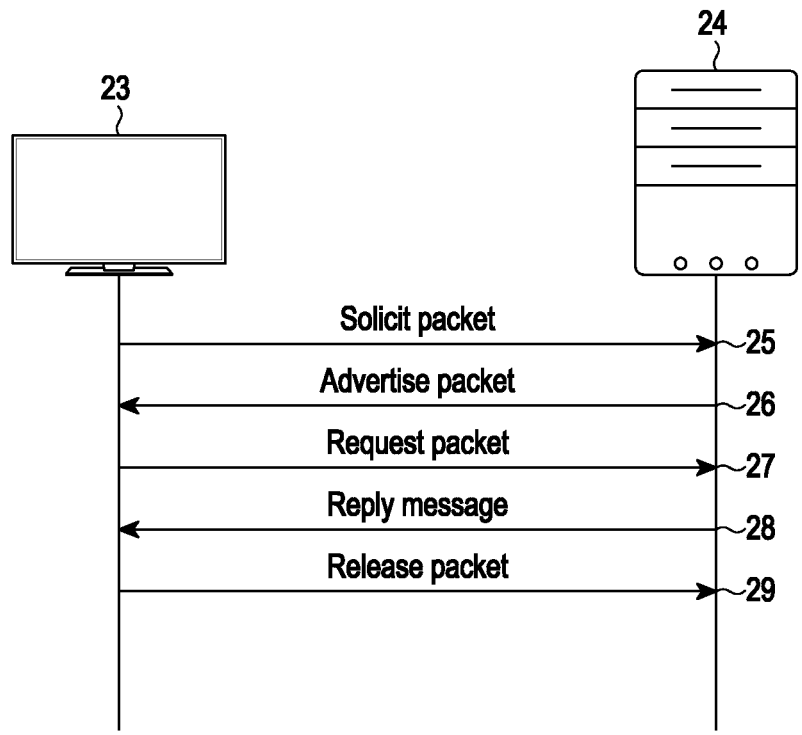
FIG. 1E is a signal flow diagram illustrating an example scenario illustrating a Dynamic Host Configuration Protocol version 6 (DHCPv6) procedure to establish communication between a client electronic device, and a DHCPv6 server, according to the prior art.

FIG. 1E is a signal flow diagram illustrating an example scenario illustrating a Dynamic Host Configuration Protocol version 6 (DHCPv6) procedure to establish communication between a client electronic device (23), and a DHCPv6 server (24), according to the prior art.

The DHCPv6 operates in a similar way to the DHCP only difference is the DHCPv6 provides network configuration parameters to IPv6 clients. The DHCPv6 also operates at the application layer of the TCP/IP protocol stack. The client electronic device (23) sends a SOLICIT packet (25) to a well-known multicast address. Any intermediate routers forward the packet to any running DHCPv6 server (24) on the network. The DHCPv6 server (24) responds with an Advertise packet (26) indicating its availability for DHCP service. The client electronic device (23) sends a Request packet (27) to the DHCPv6 server (24) for an IP address and other configuration parameters. Finally, the DHCPv6 server (24) responds with a Reply message (28). If the client electronic device (23) wishes to release the allocated IP address, the client electronic device (23) sends a Release packet (29) to the DHCPv6 server (24).

Figure 1F:
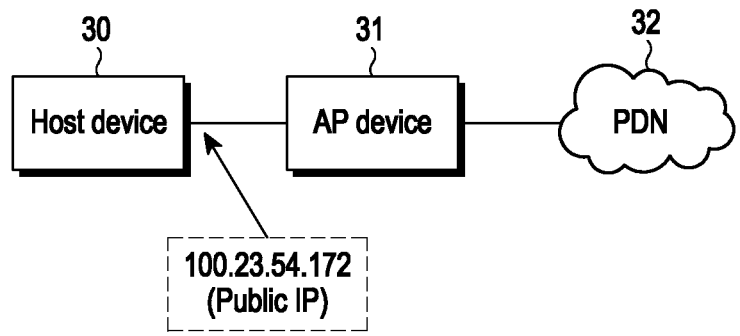
FIG. 1F is a diagram illustrating an example scenario illustrating an IP pass through in a network, according to the prior art.

FIG. 1F is a diagram illustrating an example scenario illustrating an IP pass through in a network, according to the prior art.

Considering a conventional methods and systems, some of the AP device(s) (31) also implement a feature known as IP Pass Through (IPPT) as shown in FIG. 1F, where global IP assigned from a PDN (32) is assigned directly to a single connected device (e.g., host device (30)) which may be connected either through wired or wireless medium. In this scenario, the AP device (31) acts as a bridge between the PDN (32) and the connected device (e.g., host device (30)).

Figure 1G:
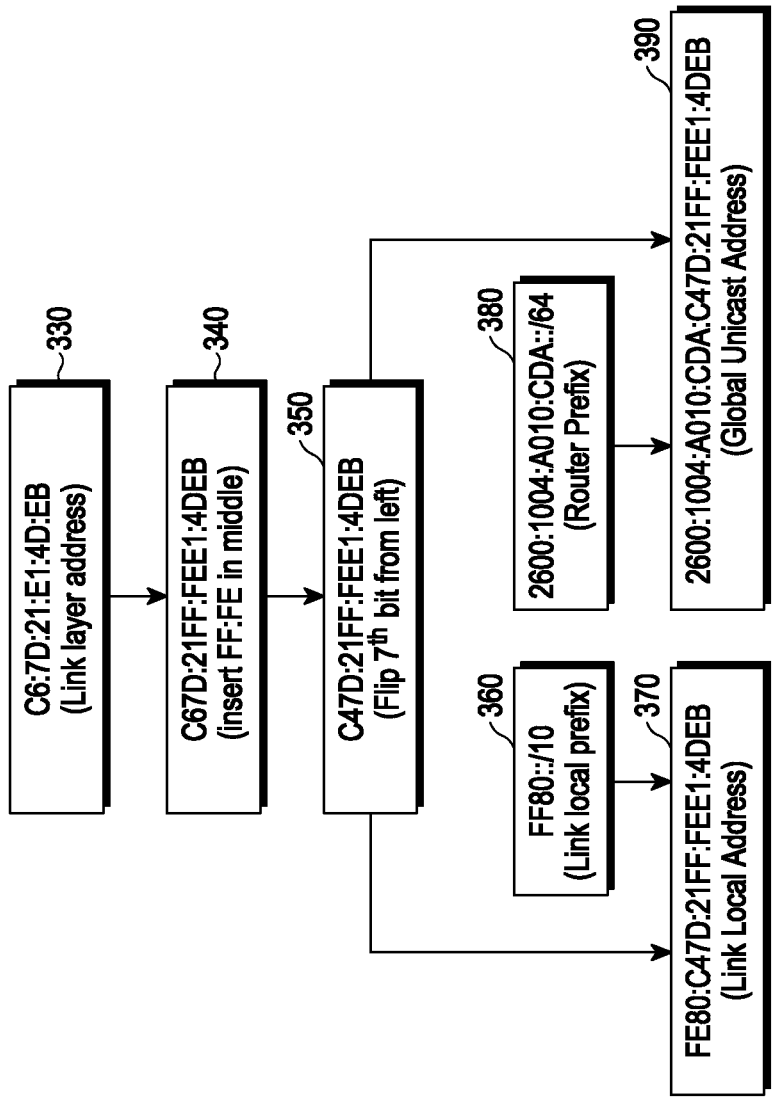
FIG. 1G is a flowchart illustrating an example scenario illustrating IPv6 address generation using a State Less Address Auto Configuration (SLAAC), according to a prior art.

FIG. 1G is a flowchart illustrating an example scenario illustrating IPv6 address generation using a State Less Address Auto Configuration (SLAAC), according to the prior art.

Considering a conventional methods and systems, with the advent of the IPv6, a new method of IP address assignment is created called the SLAAC. Where a host device(s) generate their own global IPv6 address (330) from a prefix value sent by a router running on the same link by following the procedure:
 a. 2 bytes '0xfffe' are inserted in a middle of a link layer address e.g., after 3 bytes from the left (340).
 b. The 7th bit from the left is flipped (350). The generated ID is called the Extended Unique Identifier (EUI) of the device.
 c. The EUI is combined with link local prefix fe80::/10 to get the link local address (360). The Link Local Address is used for communicating with hosts on the local link.
 d. The device broadcasts RS using the generated link local address as its own source address (370).
 e. Any router running on the same link sends back RA containing a Router prefix (380). It also contains DNS servers, MTU size etc.
 f. The router prefix and EUI are combined to get a global unicast address (390).

Any router present on the link keeps broadcasting RA to the host device(s) periodically for the host devices to refresh their IPv6 address using the prefix provided in RA packets if there is any change. The host device(s) also perform Duplicate Address Detection (DAD) after generating each of addresses for checking if any other host device(s) in the network has the same address. This new method of IP address generation eliminates the need of maintaining IP address information by the DHCP server. Also, the generated IPv6 address being globally unique, removes NAT overhead in the gateway device.

There are various Original Equipment Manufacturer (OEMs) selling routers and the AP device(s) without dual stack functionality e.g., no IPv6 support. So, when the AP device(s) runs in the IPPT mode, the IPv6 address assigned from the PDN is never assigned to the connected device and remains unused throughout a session. This results in wastage of a memory for storing IPv6 related information like IPv6 address, DNS servers etc. and also for running the IP address management mechanism. Also the AP device(s) sends the RA packets to the connected device which is never utilized by the host device(s). The AP device(s) also receives the RA packets from the PDN periodically. Finally, there is also the overhead of running the DHCPv6 server on the AP device(s). This is the scenario when the connected device(s) do not support IPv6.

There is also another scenario where the connected device may have IPv6 disabled by the user. In this case also, the IPv6 address acquired from the PDN is left unutilized. Therefore, the IPv6 address can be released to the PDN and can be acquired later if IPv6 is enabled again in the connected device.

Various conventional method/system utilizes an Optimized Network Lookup for Dual Stack Devices (Q-DNS), which describes the system for reducing the number of Domain Naming Service (DNS) queries sent from any host device and subsequently reducing DNS latency by considering the versions of IP supported by the device (e.g., connected device) and the DNS server and only sending queries for which responses will be returned. But, the given work does not emphasize about saving resources like CPU and memory in the AP device(s). Further, automated allocation and configuration of dual stack IP networks provide a framework for automatically configuring subnet prefixes and other network related metrics for dual stack devices.

Accordingly, various example embodiments herein disclose a method for Device IP Status Checking and Connection Orchestration (DISCCO). The method includes receiving, by a first electronic device, a version(s) of an Internet Protocol (IP) address from a backhaul server. Further, the method includes determining, by the first electronic device, an IP stack capability status of a second electronic device(s) using a network protocol(s), where the IP stack capability status indicates whether the received version(s) of the IP address is supported by the second electronic device(s) and the received version(s) of the IP address is enabled on the second electronic device. Further, the method includes storing, by the first electronic device, the IP stack capability status of the second electronic device(s) into a host status database of the first electronic device. Further, the method includes orchestrating, by the first electronic device, the received version(s) of the IP address with the backhaul server and/or the second electronic device(s) based on the stored IP stack capability status.

Accordingly, the embodiments herein provide the first electronic device for the DISCCO. The first electronic device includes an IP controller coupled with a processor and a memory. The IP controller receives the version(s) of the IP address from the backhaul server. Further, the IP controller determines the IP stack capability status of the second electronic device(s) using the network protocol(s), where the IP stack capability status indicates whether the received version(s) of the IP address is supported by the second electronic device(s) and the received version(s) of the IP address is enabled on the second electronic device. Further, the IP controller stores the IP stack capability status of the second electronic device(s) into the host status database of the first electronic device. Further, the IP controller orchestrates the received version(s) of the IP address with the backhaul server and/or the second electronic device(s) based on the stored IP stack capability status.

Unlike existing methods and systems, the disclosed method allows the first electronic device (e.g., Consumer Premises Equipment (CPE)) to determine the IP stack capability status of the second electronic device (e.g. mobile device) using the network protocol(s) (e.g., An Address Resolution Protocol (ARP)). The IP stack capability status indicates whether the version of the IP address (e.g., IPv4, IPv6, etc.) is supported by the second electronic device and the version of the IP address is enabled on the second electronic device. The first electronic device handles IP management, releases unusable and/or unsupported IPv4/IPv6 addresses, and acquires usable and/or supported IPv4/IPv6 addresses based on the IP stack capability status. As a result, the first electronic device reduces memory consumption, Central Processing Unit (CPU) usage, power consumption, network resources usage (e.g., fewer DNS queries), network load (e.g., Network Address Translation (NAT)), which improves an operational efficiency of the first electronic device and user experience.

Unlike existing methods and systems, the disclosed method/system aims to minimize and/or reduce wasting resources in the AP device(s) (e.g., first electronic device) by finding host device IP status and releasing any unutilized IP address which can be acquired later from the PDN if required. It finds IP statuses of host(s) connected to the AP device(s) and acquire or release IP address based on that information. The disclosed method/system will send an ARP request to check IPv4 status on the host device (e.g., second electronic device). If the host device responds by sending an ARP reply, IPv4 is enabled on the host device. Similarly, for checking IPv6, Neighbour solicit (NS) can be sent on the network and if the host device responds with a Neighbour Advertisement (NA) then IPv6 is enabled on that host. Inversely, if the AP device(s) doesn't get any response from the host device after maximum retries then the disclosed method/system will release the IP address of the corresponding version.

Referring now to the drawings and more particularly to FIGS. 2A through 9, where similar reference characters denote corresponding features consistently throughout the figures, there are shown various example embodiments.

Figure 2A:
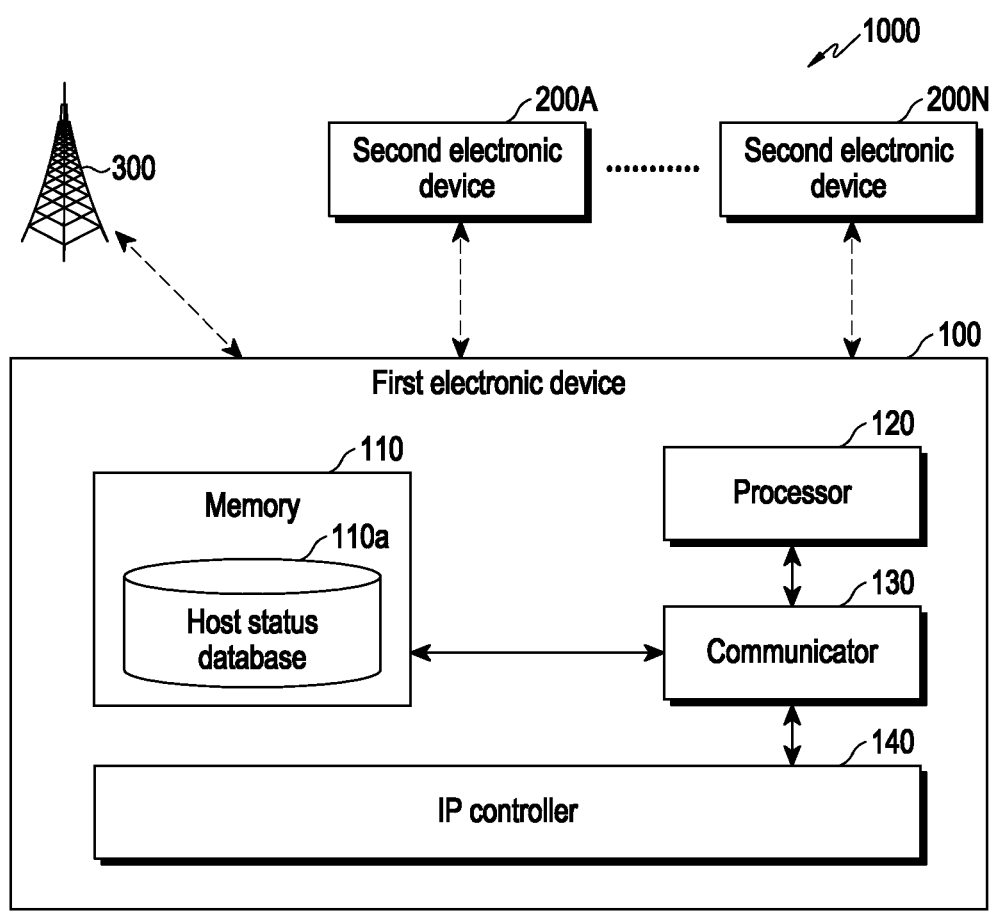
FIG. 2A is a system block diagram illustrating an example of orchestrating a different version of an IP address between a backhaul server and a second electronic device based on an IP stack capability status of the second electronic device, according to various embodiments.

FIG. 2A is a block diagram illustrating an example configuration of a system for orchestrating a different version of an IP address between a backhaul server (300) and a second electronic device(s) (200) based on an IP stack capability status of the second electronic device (200), according to various embodiments. The system (1000) includes a first electronic device (100) (e.g., Consumer Premises Equipment (CPE), access point, etc.), the backhaul server (300) (e.g., backhaul network, core network, etc.), and the second electronic device(s) (200A, 200B . . . 200N which may be referred to as 200) (e.g., laptop, mobile device, tablet, etc.).

In an embodiment, the first electronic device (100) includes a memory (110), a processor (e.g., including processing circuitry) (120), a communicator (e.g., including communication circuitry) (130), and an IP controller (e.g., including various processing and/or control circuitry) (140).

In an embodiment, the memory (110) stores an IP stack capability status of the second electronic device(s) (200) into a host status database (110a) and a version(s) of Internet Protocol (IP) received from the backhaul server (300). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the first electronic device (100), a cloud storage, or any other type of external storage.

The host status database (110a) stores the IP stack capability status of the second electronic device (200). The host status database (110a) also keeps track of a number of retries of sending the packets so that decision can be taken by the first electronic device (100) whether the corresponding version of IP is enabled or disabled. The host status database (110a) can reside in the permanent storage as it helps reduce memory footprint of the first electronic device (100). Following fields are stored for each connected second electronic device (200) (e.g., connected host device) in the first electronic device (100), as shown in Table-1.

TABLE 1

| Stored entity | Functionality |
|---|---|
| ipv4 address | IPv4 address of the connected host device |
| ipv6 address | IPv6 address of the connected host device |
| link layer address | Layer 2 address of the host device. In case of Ethernet, it would be MAC address |
| v4 retry count | Number of times ARP REQUEST has been sent to the host device (second electronic device (200)) before receiving a response. This field is reset to zero after receiving a response. If this field value exceeds |

TABLE 1-continued

| Stored entity | Functionality |
|---|---|
| | maximum number of retries, it can be concluded that IPv4 is disabled or not supported for that host device |
| v6 retry count | Number of times Neighbour solicit has been sent to the host device second electronic device (200)) before receiving a response. This field is reset to zero after receiving a response. If this field value exceeds maximum number of retries, it can be concluded that IPv6 is disabled or not supported for that host device |
| network v4 status | This field is True if global IPv4 address is assigned to AP device (e.g., first electronic device (100)) from the PDN (e.g., backhaul server (300)) and False otherwise |
| network v6 status | This field is True if global IPv6 address is assigned to AP device from PDN and False otherwise |

The processor (120) may include various processing circuitry and communicates with the memory (110), the communicator (130), and the IP controller (140). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) may include various communication circuitry and is configured for communicating internally between internal hardware components and with external devices (e.g. eNodeB, gNodeB, server, mobile device, laptop, etc.) via one or more networks (e.g. Radio technology). The communicator (130) includes an electronic circuit specific to a standard that enables wired or wireless communication.

The IP controller (140) may be implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The IP controller (140) and the processor (120) may be integrally referred to as at least one processor.

In an embodiment, the IP controller (140) receives a version of the IP address from the backhaul server (300). The version of the IP address includes an Internet Protocol version 4 (IPv4) address and an Internet Protocol version 6 (IPv6) address. The IP controller (140) determines the IP stack capability status of the second electronic device (200) using the network protocol(s), where the IP stack capability status indicates whether the received version of the IP address is supported by the second electronic device (200) and the received version of the IP address is enabled on the second electronic device (200). The network protocol(s) includes an Address Resolution Protocol (ARP) and a Dynamic Host Configuration Protocol (DHCP) for the IPv4 address, a Neighbour Discovery Protocol (NDP), and a Dynamic Host Configuration Protocol version 6 (DHCPv6).

The IP controller (140) sends a packet associated with the IPv4 address to the second electronic device (200). The IP controller (140) initiates a v4 retry count in response to sending the packet to the second electronic device (200). The IP controller (140) initiates a timer in response to sending the packet to the second electronic device (200). The IP controller (140) determines whether a response of the packet is received from the second electronic device (200) before the timer expires and whether the v4 retry count is within a threshold limit. The IP controller (140) detects that the IPv4 address is supported by the second electronic device (200) and the IPv4 address is enabled on the second electronic device (200) in response to determining that the response of the packet is received from the second electronic device (200) before the timer expires and the v4 retry count is within the threshold limit. The IP controller (140) detects that the IPv4 address is not supported by the second electronic device (200) and the IPv4 address is not enabled on the second electronic device (200) in response to determining that the response of the packet is received from the second electronic device (200) after the timer expires and the v4 retry count crosses the threshold limit. The IP controller (140) detects that the IPv4 address is not supported by the second electronic device (200) and the IPv4 address is not enabled on the second electronic device (200) in response to determining that the response of the packet is not received from the second electronic device (200) before the timer expires and the v4 retry count crosses the threshold limit.

The IP controller (140) sends a packet associated with the IPv6 address to the second electronic device (200). The IP controller (140) initiates the v6 retry count in response to sending the packet to the second electronic device (200). The IP controller (140) initiates a timer in response to sending the packet to the second electronic device (200). The IP controller (140) determines whether a response of the packet is received from the second electronic device (200) before the timer expires and whether the v6 retry count is within a threshold limit. The IP controller (140) detects that the IPv6 address is supported by the second electronic device (200) and the IPv6 address is enabled on the second electronic device (200) in response to determining that the response of the packet is received from the second electronic device (200) before the timer expires and the v6 retry count is within the threshold limit. The IP controller (140) detects that the IPv6 address is not supported by the second electronic device (200) and the IPv6 address is not enabled on the second electronic device (200) in response to determining that the response of the packet is received from the second electronic device (200) after the timer expires and the v6 retry count crosses the threshold limit. The IP controller (140) detects that the IPv6 address is not supported by the second electronic device (200) and the IPv6 address is not enabled on the second electronic device (200) in response to determining that the response of the packet is not received from the second electronic device (200) before the timer expires and the v6 retry count crosses the threshold limit.

The IP controller (140) stores the IP stack capability status of the second electronic device (200) into the host status database (110a) of the first electronic device (100). The IP controller (140) orchestrates the received version of the IP address with the backhaul server (300) and/or the second electronic device (200) based on the stored IP stack capability status. The IP controller (140) releases the received version of the IP address and sends the released version of the IP address to the backhaul server (300) when the received version of the IP address is not supported by the second electronic device (200) and the received version of the IP address is not enabled on the second electronic device (200). The IP controller (140) acquires the received version of the IP address from the Backhaul server (300) to communicate with the second electronic device (200) when the received version of the IP address is supported by the second electronic device (200) and the received version of the IP address is enabled on the second electronic device (200).

The IP controller (140) receives an IPv4 address disable indication from the second electronic device (200), where the IPv4 address is manually disabled by the user of the second electronic device (200). The IP controller (140) releases the IPv4 address upon receiving the IPv4 address disable indication. The IP controller (140) sends the released IPv4 address to the backhaul server (300) to terminate IP management associated with the released IPv4 address.

The IP controller (140) receives an IPv6 address disable indication from the second electronic device (200), where the IPv6 address is manually disabled by the user of the second electronic device (200). The IP controller (140) releases the IPv6 address upon receiving the IPv6 address disable indication. The IP controller (140) sends the released IPv6 address to the backhaul server (300) to terminate IP management associated with the released IPv6 address.

The IP controller (140) terminates IP management associated with the received version of the IP address when the received version of the IP address is not supported by the second electronic device (200) and the received version of the IP address is not enabled on the second electronic device (200).

The IP controller (140) receives an IPv4 address enable indication from the second electronic device (200), where the IPv4 address is manually enabled by the user of the second electronic device (200). The IP controller (140) sends an IPv4 address allocation request to the backhaul server (300) upon receiving the IPv4 address enable indication. The IP controller (140) receives the IPv4 address from the backhaul server (300). The IP controller (140) allocates the received IPv4 address to the second electronic device (200).

The IP controller (140) receives an IPv6 address enable indication from the second electronic device (200), where the IPv6 address is manually enabled by the user of the second electronic device (200). The IP controller (140) sends an IPv6 address allocation request to the backhaul server (300) upon receiving the IPv6 address enable indication. The IP controller (140) receives the IPv6 address from the backhaul server (300). The IP controller (140) allocates the received IPv6 address to the second electronic device (200).

Although FIG. 2A illustrates various hardware components of the first electronic device (100) it is to be understood that various embodiments are not limited thereon. In various embodiments, the first electronic device (100) may include less or more number of components. Further, the labels or names of the components are used only for illustrative purpose and does not limit the scope of the disclosure. One or more components can be combined together to perform same or substantially similar function to the DISCCO.

Figure 2B:
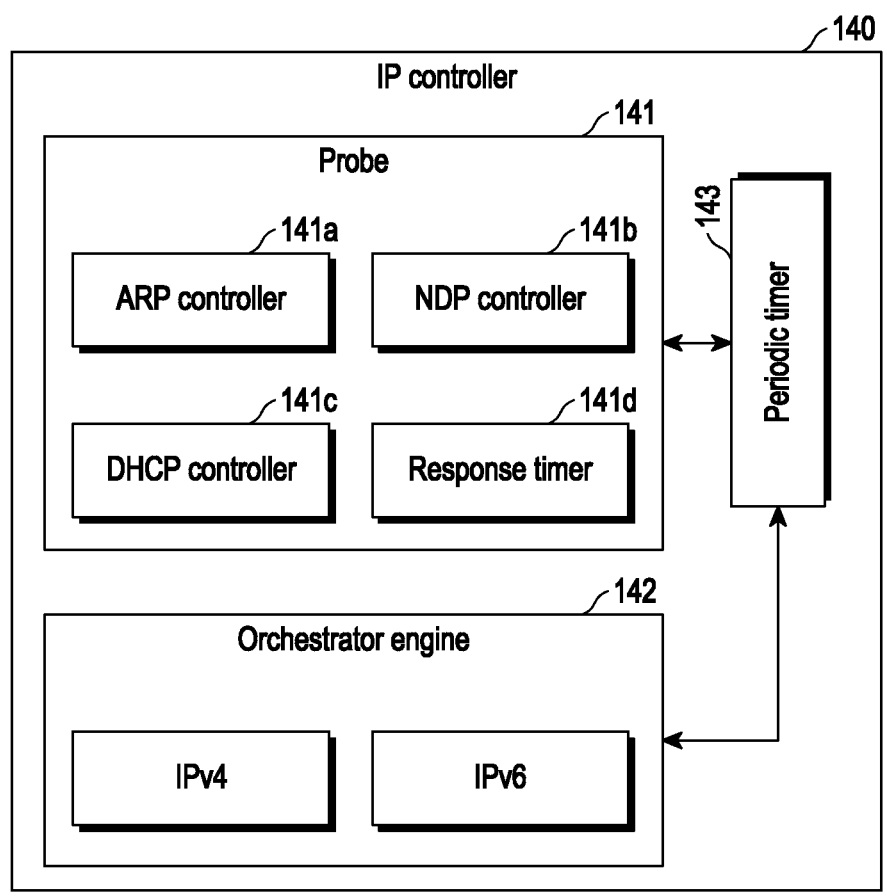
FIG. 2B is a block diagram illustrating an example configuration of an IP controller of a first electronic device for orchestrating a different version of an IP address between a backhaul server and a second electronic device based on an IP stack capability status of the second electronic device, according to various embodiments.

FIG. 2B is a block diagram illustrating an example configuration of the IP controller (140) of the first electronic device (100) for orchestrating the different versions of the IP address between the backhaul server (300) and the second electronic device (200) based on the IP stack capability status of the second electronic device (200), according to various embodiments.

In an embodiment, the IP controller (140) includes a probe (e.g., including various processing circuitry and/or executable program instructions) (141), an orchestrator engine (e.g., including various processing circuitry and/or executable program instructions) (142), and a periodic timer (143).

The probe (141) is responsible for sending periodic ARP requests to all the connected devices (e.g., the second electronic device (200)) for checking the IPv4 is enabled and neighbour solicit requests to check the IPv6 is enabled. The probe (141) sends these requests periodically and updates the status in the host status database (110*a*) based on a response. The probe (141) would also add new entries in the host status database (110*a*) whenever any new host device (e.g., the second electronic device (200)) is connected to the network by listening to DHCP events for the IPv4 and Router Solicitation (RS) events for the IPv6. The probe (141) sends the ARP request and the neighbour solicit requests to each of the connected devices and listen for the response. If an ARP reply is received, the IPv4 is enabled on the host device. Similarly, the IPv6 is enabled if Neighbour Advertisement (NA) is received. The host status database (110*a*) is updated with the link layer address of the host device by extracting it from the ARP reply packet. If the response is not received, the retry count is incremented for that host device in the host status database (110*a*). If the retry count exceeds the maximum number of retries, the IP address of the corresponding version for that host device is cleared out indicating it might be disabled or not supported.

The probe (141) includes an ARP controller (141*a*), an NDP controller (141*b*), a DHCP controller (141*c*), each of which may include various processing circuitry and/or executable program instructions, and a response timer (141*d*). The ARP controller (141*a*) sends the ARP request to all the connected devices (e.g., the second electronic device (200)) for checking whether the IPv4 is enabled or not. The NDP controller (141*b*) sends the neighbour solicit request to check whether the IPv6 is enabled or not. The DHCP controller (141*c*) listens for specific DHCP packets for finding the IP stack capability status of both the IPv4 and the IPv6.

The response timer (141*d*) is started whenever any packet (e.g., ARP packet/packet associated with the IPv4 address, Neighbour Solicitation (NS) packet/packet associated with the IPv6 address) is sent. The response by the connected device (e.g., second electronic device (200)) should come before the expiry of the response timer (141*d*). If the response doesn't arrive before the expiry of the response timer (141*d*), the retry count is incremented in the host status database (110*a*). For example, a total of three failed attempts to get the response packet from the connected device is inferred as the corresponding IP stack is not supported or disabled. After getting the response to the packets sent, the probe (141) updates the host status database (110*a*).

The orchestrator engine (142) may include various processing circuitry and/or executable program instructions, and is responsible for reading the host status database (110*a*) periodically and deciding whether the IP address needs to be acquired or released based on the IP stack capability status of all connected host devices. The orchestrator engine (142) then sends a request based on a decision taken. In the case of cellular routers, a request would be sent to a modem. In the case of regular routers, it would be directly sent through a network interface card. The orchestrator engine (142) examines the retry count of all the host devices in the network for both IP versions and determines the overall network status (e.g., IP stack capability status) for both IPv4 and IPv6. After finding out, the orchestrator engine (142) compares with a current network status (e.g., IP stack capability status) and decides to acquire or release the IP address. The frequency of the orchestrator engine (142) of reading the host status database (110*a*) is much less than the frequency of the probe (141) updating the host status database (110a). It ensures there is a low amount of toggling in IP address acquisition and release and also stops the IP management. The periodic timer (143) triggers the periodic execution of both the probe (141) and the orchestrator engine (142).

To calculate the resources saved with the disclosed DISCCO (e.g., IP controller (140)), consider CPU (e.g., processor (120)) time utilized by IP address management programs running on the AP device for both IPv4 and IPv6. Let 'T' be the CPU time utilized by the IP address management running without the DISCCO. In this case, both IPv4 and IPv6 address management programs would be running irrespective of the host device IP status. Therefore, $$T = T_{v4} + T_{v6} \quad (1)$$

Where $T_{v4}$ and $T_{v6}$ are the CPU time utilized by the IP address management for collectively managing IPv4 and IPv6 respectively.

Let T' be the CPU time utilized by the IP address management running with the DISCCO. In this case, IPv4 address management would be running only if the connected device(s) support only IPv4 and similarly for IPv6. Therefore, $$T' = P_{v4}T_{v4} + P_{v6}T_{v6} + P_{v4v6}(T_{v4} + T_{v6}) + T_{discco} \quad (2)$$

Where, $P_{v4}$, $P_{v6}$, and $P_{v4v6}$ are the probabilities that connected device(s) have only IPv4 enabled, only IPv6 enabled and both IPv4 and IPv6 enabled respectively. $T_{discco}$ is the CPU time utilized by the DISCCO.

To calculate the CPU time for DISCCO, for example, considered ARM Cortex A9 processor operating at 7500 Million Instructions Per Second (MIPS). The CPU time can be calculated by counting the number of instructions in both mechanisms when they execute the longest branch and adding them. The number of instructions executed for the mechanism will be, $$T_{probe} = 14n \quad (3)$$

$$T_{orchestrator} = 4 + 4n + 8 \quad (4)$$

Where, n denotes the number of connected devices (e.g., second electronic device (200)). Therefore, $$T_{discco} = T_{probe} + T_{orchestrator} = 12 + 18n \quad (5)$$

A theoretical limit of the number of devices that can be connected is 255 in the case of wireless AP devices for a small private network. Therefore, the number of instructions executed would be, $$12 + 18n = 12 + 18 * 255 = 4602$$

The time required to execute 4602 instructions at 7500 MIPS would be approximately 600 ns. Therefore, this can be ignored as the value is very small as compared to CPU time usage of all the IP address management. This also applies to the memory usage of the DISCCO because the host status database (110a) resides in permanent storage and there is no significant memory usage. Therefore, the CPU time saved δ using the DISCCO would be, $$\delta = T - T' \quad (6)$$

Which simplifies to, $$\delta = T_{v4}(1 - P_{v4} - P_{v4v6}) + T_{v6}(1 - P_{v6} - P_{v4v6}) \quad (7)$$

Figure 3:
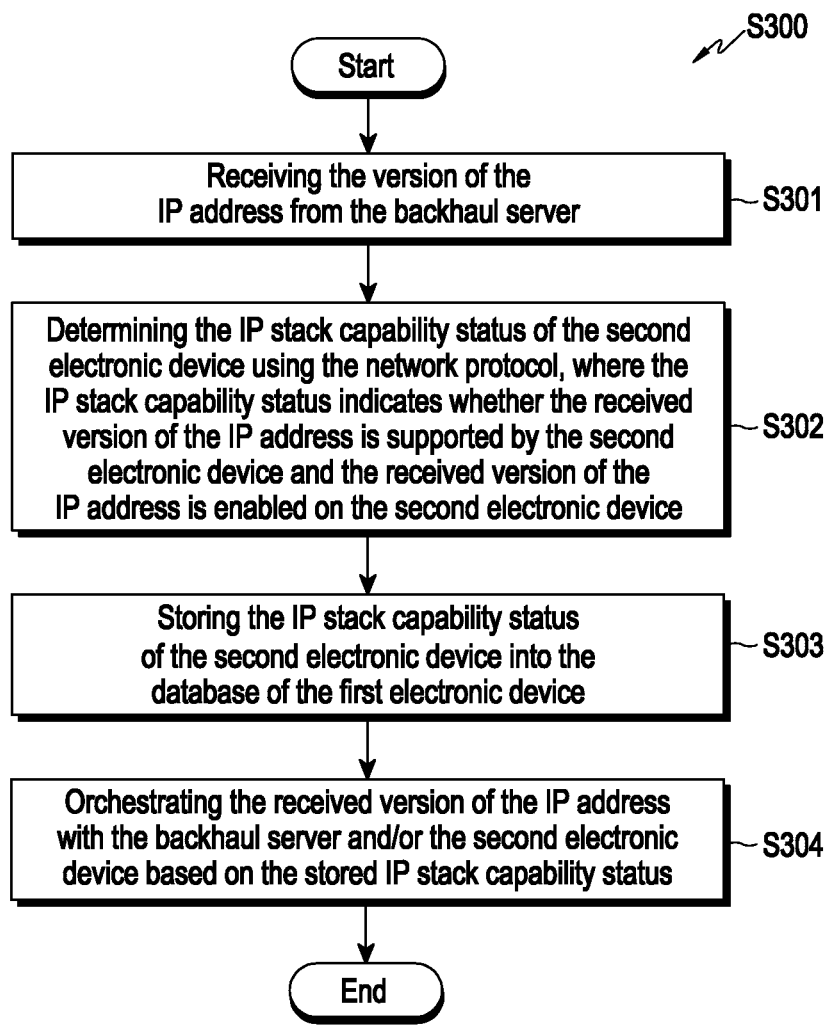
FIG. 3 is a flowchart illustrating an example method for orchestrating the different versions of the IP address between the backhaul server and the second electronic device based on the IP stack capability status of the second electronic device, according to various embodiments.

FIG. 3 is a flowchart (S300) illustrating an example method for orchestrating the different versions of the IP address between the backhaul server (300) and the second electronic device (200) based on the IP stack capability status of the second electronic device (200), according to various embodiments.

At S301, the method includes receiving the version(s) of the IP address from the backhaul server (300). At S302, the method includes determining the IP stack capability status of the second electronic device (200) using the network protocol, where the IP stack capability status indicates whether the received version(s) of the IP address is supported by the second electronic device (200) and the received version(s) of the IP address is enabled on the second electronic device (200). At S303, the method includes storing the IP stack capability status of the second electronic device into the host status database (110a) of the first electronic device (100). At S304, the method includes orchestrating the received version(s) of the IP address with the backhaul server (300) and/or the second electronic device (200) based on the stored IP stack capability status.

The various actions, acts, blocks, steps, or the like in the flowchart (S300) may be performed in the order presented, in a different order or simultaneously. Further, in various embodiments, some of the actions, acts, blocks, steps, or the like may be omitted, added, modified, skipped, or the like without departing from the scope of the disclosure.

Figure 4:
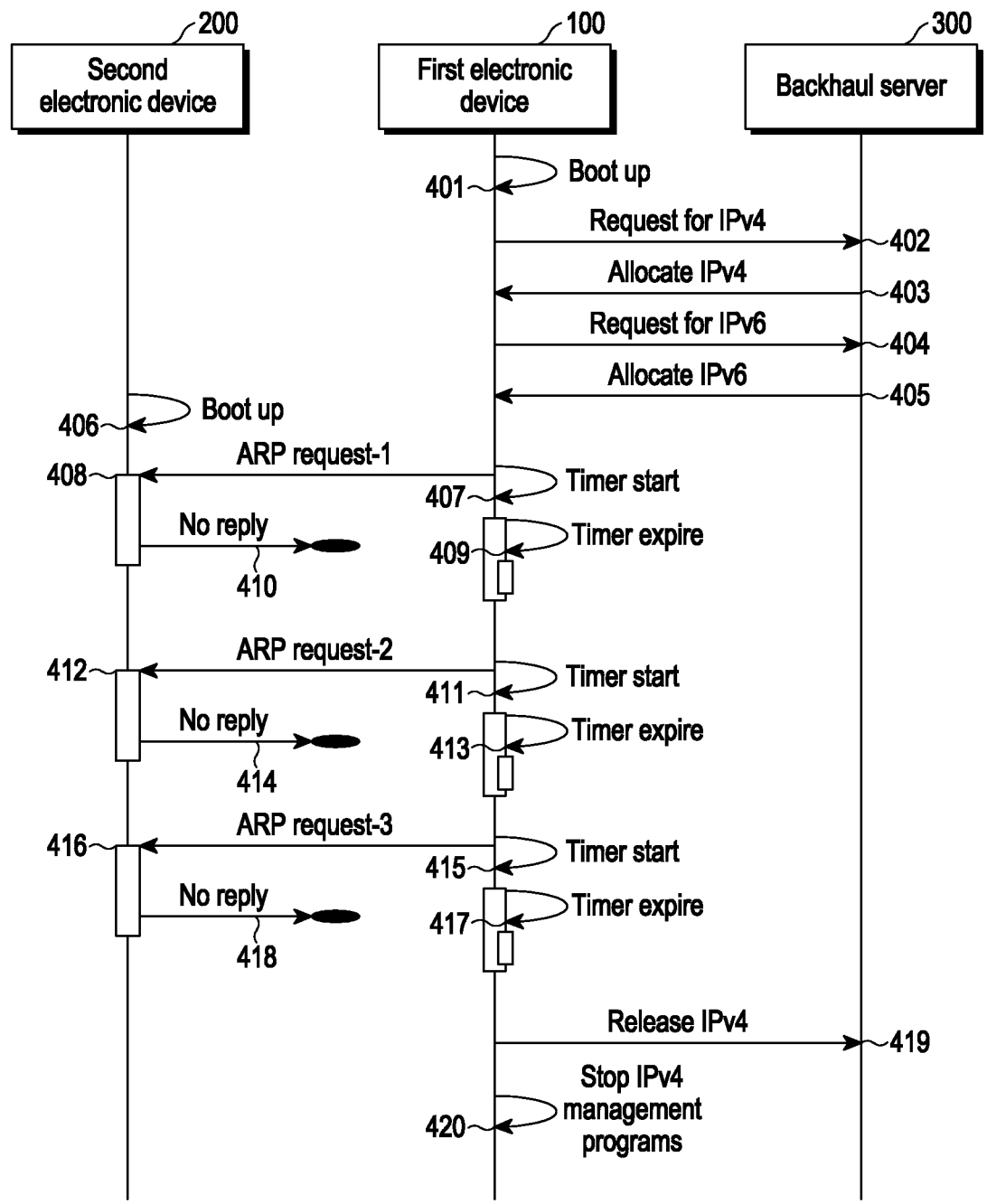
FIG. 4 is a signal flow diagram illustrating various example operations for orchestrating the different versions of the IP address between the backhaul server and the second electronic device using a timer mechanism when an IPv4 address is not supported by the second electronic device, according to various embodiments.

FIG. 4 is signal flow diagram illustrating various example operations for orchestrating the different versions of the IP address between the backhaul server (300) and the second electronic device (200) using a timer mechanism when the IPv4 address is not supported by the second electronic device (200), according to various embodiments.

At 401-402, when the first electronic device (100) detects boot up, the first electronic device (100) sends a request for the IPv4 address to the backhaul server (300). At 403, the backhaul server (300) allocates the IPv4 address to the first electronic device (100) upon receiving the request for the IPv4 address. At 404, the first electronic device (100) sends a request for the IPv6 address to the backhaul server (300). At 405, the backhaul server (300) allocates the IPv6 address to the first electronic device (100) upon receiving the request for the IPv6 address.

At 406, the first electronic device (100) detects a boot up associated with the second electronic device (200). At 407-408, when the first electronic device (100) needs to know the physical addresses of the second electronic device (200), the first electronic device (100) broadcasts an ARP request packet (e.g., ARP request-1) to the second electronic device (200), initiates the response timer (141d), and increments a value of the retry count (V4) (in this case the retry count (V4) value is 1) in response to sending the ARP request packet. At 409-410, the first electronic device (100) detects that the IPv4 address does not support by the second electronic device (200) as the first electronic device (100) does not receive an ARP reply packet (no reply) from the second electronic device (200) before expiry of the response timer (141d). The probe (141) of the first electronic device (100) then increments the retry count (V4) in the host status database (110a), where the retry count (V4) indicates how many failed attempts to the second electronic device (200) were made before receiving the ARP reply packet.

At 411-412, the first electronic device (100) determines whether the retry count (V4) is within a threshold value (e.g., 3) (in this case the retry count (V4) value is 2, which is within the threshold value). The first electronic device (100). The first electronic device (100) then sends an ARP request packet (e.g., ARP request-2) to the second electronic device (200) and initiates the response timer (141d) in response to sending the ARP request packet. At 413-414, the first electronic device (100) detects that the IPv4 address does not support by the second electronic device (200) as the first electronic device (100) does not receive the ARP reply packet (no reply) from the second electronic device (200) before expiry of the response timer (141*d*). The probe (141) of the first electronic device (100) then increments the retry count (V4) in the host status database (110*a*).

At 415-416, the first electronic device (100) determines whether the retry count (V4) is within the threshold value (e.g., 3) (in this case the retry count (V4) value is 3, which is within the threshold value). The first electronic device (100). The first electronic device (100) then sends an ARP request packet (e.g., ARP request-3) to the second electronic device (200) and initiates the response timer (141*d*) in response to sending the ARP request packet. At 417-418, the first electronic device (100) detects that the IPv4 address does not support by the second electronic device (200) as the first electronic device (100) does not receive the ARP reply packet (no reply) from the second electronic device (200) before expiry of the response timer (141*d*). The probe (141) of the first electronic device (100) then increments the retry count (V4) in the host status database (110*a*).

At 419, the first electronic device (100) determines whether the retry count (V4) is within the threshold value (e.g., 3) (in this case the retry count (V4) value is 4, which is greater than the threshold value). As a result, the first electronic device (100) detects that the IPv4 address does not support by the second electronic device (200). The first electronic device (100) then releases the allocated IPv4 address and sends the released IPv4 address to the backhaul server (300). At 420, the first electronic device (100) terminates IP management, which is associated with the IPv4 address. As a result, the first electronic device (100) reduces memory consumption/CPU usage/power consumption/network resources usage/load, and the first electronic device (100) increases the operational efficiency, which improves user experience.

Figure 5:
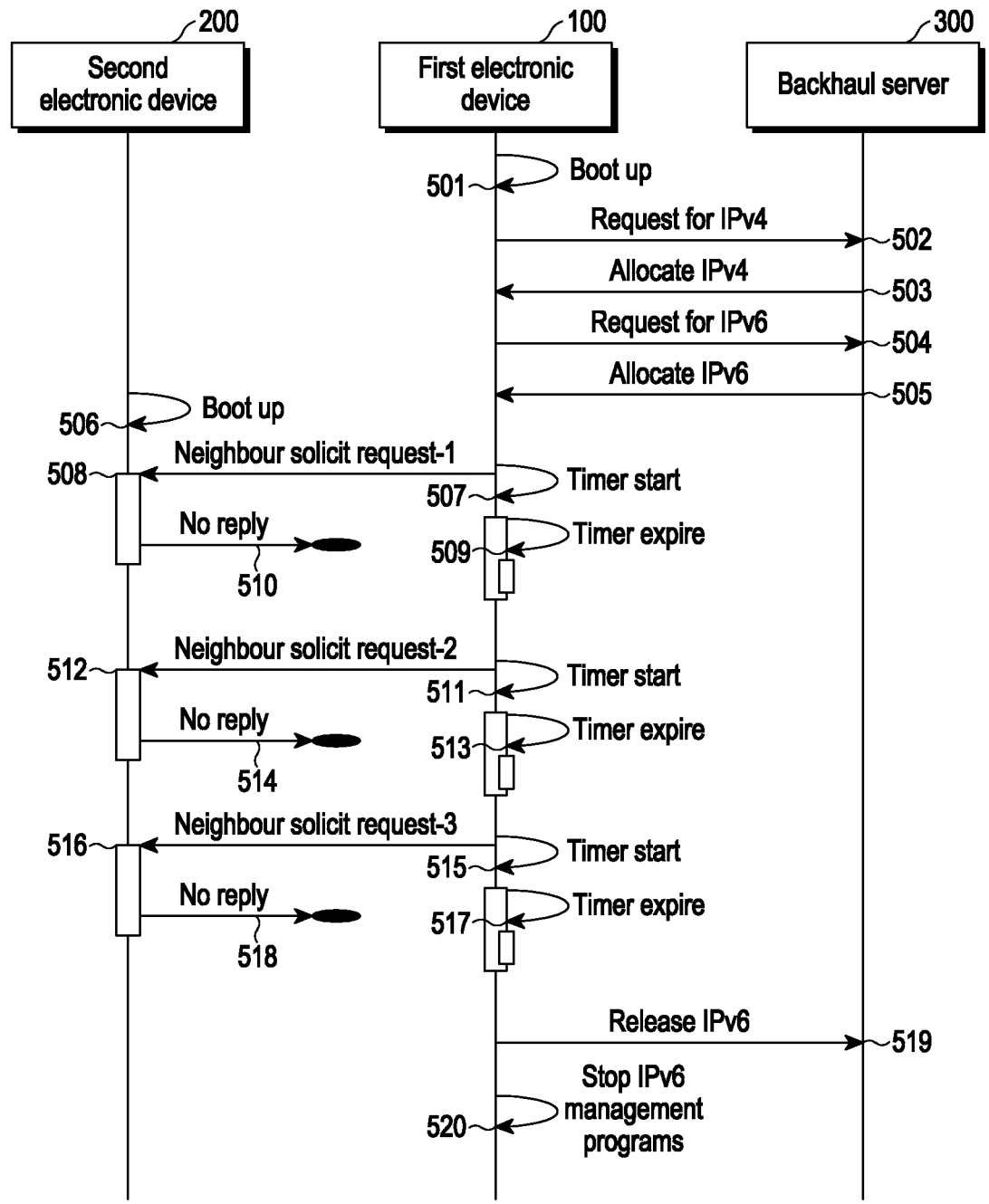
FIG. 5 is a signal flow diagram illustrating various example operations for orchestrating the different versions of the IP address between the backhaul server and the second electronic device using the timer mechanism when an IPv6 address is not supported by the second electronic device, according to various embodiments.

FIG. 5 is a signal flow diagram illustrating various example operations for orchestrating the different versions of the IP address between the backhaul server (300) and the second electronic device (200) using the timer mechanism when the IPv6 address is not supported by the second electronic device (200), according to various embodiments.

At 501-502, when the first electronic device (100) detects boot up, the first electronic device (100) sends a request for the IPv4 address to the backhaul server (300). At 503, the backhaul server (300) allocates the IPv4 address to the first electronic device (100) upon receiving the request for the IPv4 address. At 504, the first electronic device (100) sends a request for the IPv6 address to the backhaul server (300). At 505, the backhaul server (300) allocates the IPv6 address to the first electronic device (100) upon receiving the request for the IPv6 address.

At 506, the first electronic device (100) detects a boot up associated with the second electronic device (200). At 507-508, when the first electronic device (100) needs to know the physical addresses of the second electronic device (200), the first electronic device (100) broadcasts a neighbour solicit request-1 to the second electronic device (200), initiates the response timer (141*d*), and increments a value of the retry count (V6) (in this case the retry count (V6) value is 1) in response to sending the neighbour solicit request-1. At 509-510, the first electronic device (100) detects that the IPv6 address does not support by the second electronic device (200) as the first electronic device (100) does not receive a response (no reply) from the second electronic device (200) before expiry of the response timer (141*d*). The probe (141) of the first electronic device (100) then increments the retry count (V6) in the host status database (110*a*), where the retry count (V6) indicates how many failed attempts to the second electronic device (200) were made before receiving the response.

At 511-512, the first electronic device (100) determines whether the retry count (V6) is within a threshold value (e.g., 3) (in this case the retry count (V6) value is 2, which is within the threshold value). The first electronic device (100). The first electronic device (100) then sends a neighbour solicit request-2 to the second electronic device (200) and initiates the response timer (141*d*) in response to sending the neighbour solicit request-2. At 513-514, the first electronic device (100) detects that the IPv6 address does not support by the second electronic device (200) as the first electronic device (100) does not receive the response (no reply) from the second electronic device (200) before expiry of the response timer (141*d*). The probe (141) of the first electronic device (100) then increments the retry count (V6) in the host status database (110*a*).

At 515-516, the first electronic device (100) determines whether the retry count (V6) is within the threshold value (e.g., 3) (in this case the retry count (V6) value is 3, which is within the threshold value). The first electronic device (100). The first electronic device (100) then sends a neighbour solicit request-3 to the second electronic device (200) and initiates the response timer (141*d*) in response to sending the neighbour solicit request-3. At 517-518, the first electronic device (100) detects that the IPv6 address does not support by the second electronic device (200) as the first electronic device (100) does not receive the response (no reply) from the second electronic device (200) before expiry of the response timer (141*d*). The probe (141) of the first electronic device (100) then increments the retry count (V6) in the host status database (110*a*).

At 519, the first electronic device (100) determines whether the retry count (V6) is within the threshold value (e.g., 3) (in this case the retry count (V6) value is 4, which is greater than the threshold value). As a result, the first electronic device (100) detects that the IPv6 address does not support by the second electronic device (200). The first electronic device (100) then releases the allocated IPv6 address and sends the released IPv6 address to the backhaul server (300). At 520, the first electronic device (100) terminates IP management, which is associated with the IPv6 address. As a result, the first electronic device (100) reduces memory consumption/CPU usage/power consumption/network resources usage/load, and the first electronic device (100) increases the operational efficiency, which improves the user experience.

Figure 6:
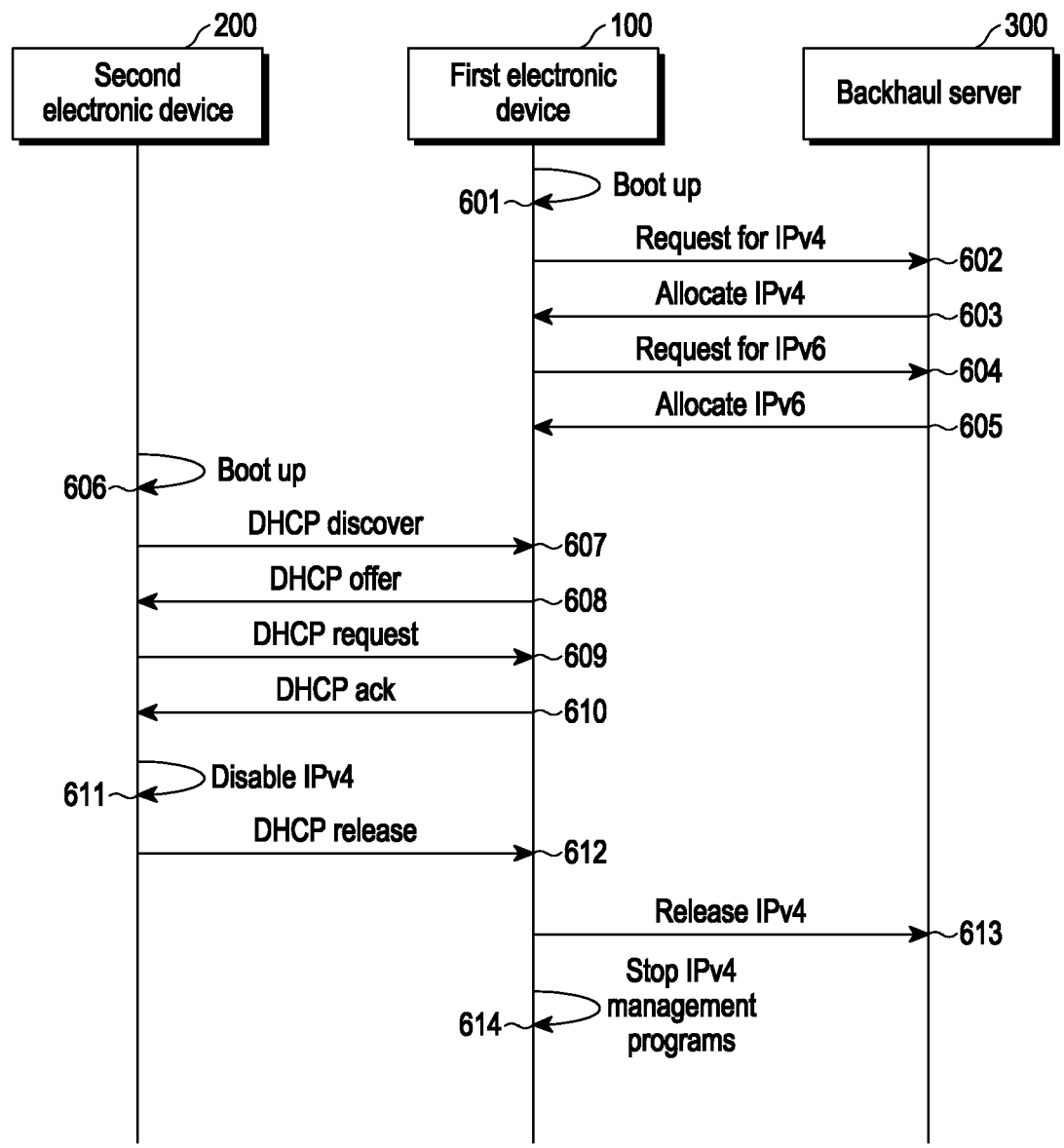
FIG. 6 is a signal flow diagram illustrating various example operations for orchestrating the different versions of the IP address between the backhaul server and the second electronic device when the IPv4 address is manually disabled by a user of the second electronic device, according to various embodiments.

FIG. 6 is a signal flow diagram illustrating various example operations for orchestrating the different versions of the IP address between the backhaul server (300) and the second electronic device (200) when the IPv4 address is manually disabled by the user of the second electronic device (200), according to various embodiments.

At 601-602, when the first electronic device (100) detects boot up, the first electronic device (100) sends a request for the IPv4 address to the backhaul server (300). At 603, the backhaul server (300) allocates the IPv4 address to the first electronic device (100) upon receiving the request for the IPv4 address. At 604, the first electronic device (100) sends a request for the IPv6 address to the backhaul server (300). At 605, the backhaul server (300) allocates the IPv6 address to the first electronic device (100) upon receiving the request for the IPv6 address.

At 606, the first electronic device (100) detects a boot up associated with the second electronic device (200). At 607, the second electronic device (200) to get DHCP information broadcasts a DHCP discover on a network/towards the first electronic device (100). At 608, the first electronic device (100) responds with a DHCP offer packet containing potential configuration parameters. At 609, if the second electronic device (200) accepts offered parameters (potential configuration parameters), the second electronic device (200) sends a DHCP request packet indicating the allocation of offered parameters. At 610, finally, the first electronic device (100) allocates parameters and sends a DHCP ack to the second electronic device (200).

At 611, the IPv4 address is manually disabled by the user of the second electronic device (200). At 612, the first electronic device (100) receives an IPv4 address disable indication (e.g., DHCP release) from the second electronic device (200). At 613, the first electronic device (100) releases the IPv4 address upon receiving the IPv4 address disable indication and sends the released IPv4 address to the backhaul server (300) to terminate IP management associated with the released IPv4 address. At 614, the first electronic device (100) terminates IP management, which is associated with the IPv4 address. As a result, the first electronic device (100) reduces memory consumption/CPU usage/power consumption/network resources usage/load, and the first electronic device (100) increases the operational efficiency, which improves the user experience.

Figure 7:
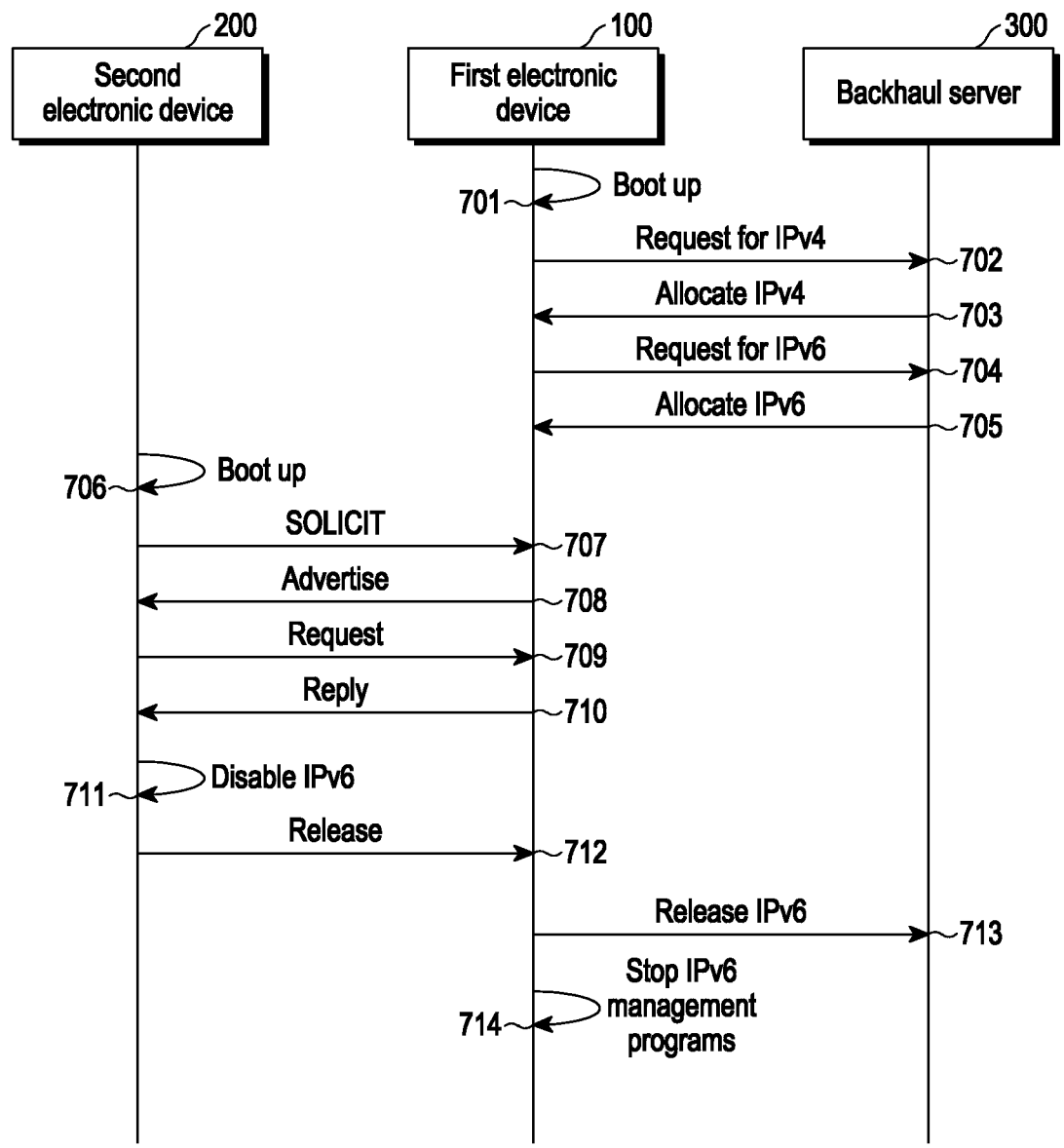
FIG. 7 is a signal flow diagram illustrating various example operations for orchestrating the different versions of the IP address between the backhaul server and the second electronic device when the IPv6 address is manually disabled by the user of the second electronic device, according to various embodiments.

FIG. 7 is a signal flow diagram illustrating various example operations for orchestrating the different versions of the IP address between the backhaul server (300) and the second electronic device (200) when the IPv6 address is manually disabled by the user of the second electronic device (200), according to various embodiments.

At 701-702, when the first electronic device (100) detects boot up, the first electronic device (100) sends a request for the IPv4 address to the backhaul server (300). At 703, the backhaul server (300) allocates the IPv4 address to the first electronic device (100) upon receiving the request for the IPv4 address. At 704, the first electronic device (100) sends a request for the IPv6 address to the backhaul server (300). At 705, the backhaul server (300) allocates the IPv6 address to the first electronic device (100) upon receiving the request for the IPv6 address.

At 706, the first electronic device (100) detects a boot up associated with the second electronic device (200). At 707, the second electronic device (200) sends a SOLICIT packet to a well-known multicast address. Any intermediate routers forward the packet to the first electronic device (100) (any running DHCPv6 server) on the network. At 708, the first electronic device (100) responds with an Advertise packet indicating its availability for DHCP service. At 709, the second electronic device (200) sends a Request packet to the first electronic device (100) (e.g., DHCPv6 server) for the IP address and other configuration parameters. At 710, finally, the first electronic device (100) responds with a reply message.

At 711, the IPv6 address is manually disabled by the user of the second electronic device (200). At 712, the first electronic device (100) receives an IPv6 address disable indication (e.g., release) from the second electronic device (200). At 713, the first electronic device (100) releases the IPv6 address upon receiving the IPv6 address disable indication and sends the released IPv6 address to the backhaul server (300) to terminate IP management associated with the released IPv6 address. At 714, the first electronic device (100) terminates IP management, which is associated with the IPv6 address. As a result, the first electronic device (100) reduces memory consumption/CPU usage/power consumption/network resources usage/load, and the first electronic device (100) increases the operational efficiency, which improves the user experience.

Figure 8A:
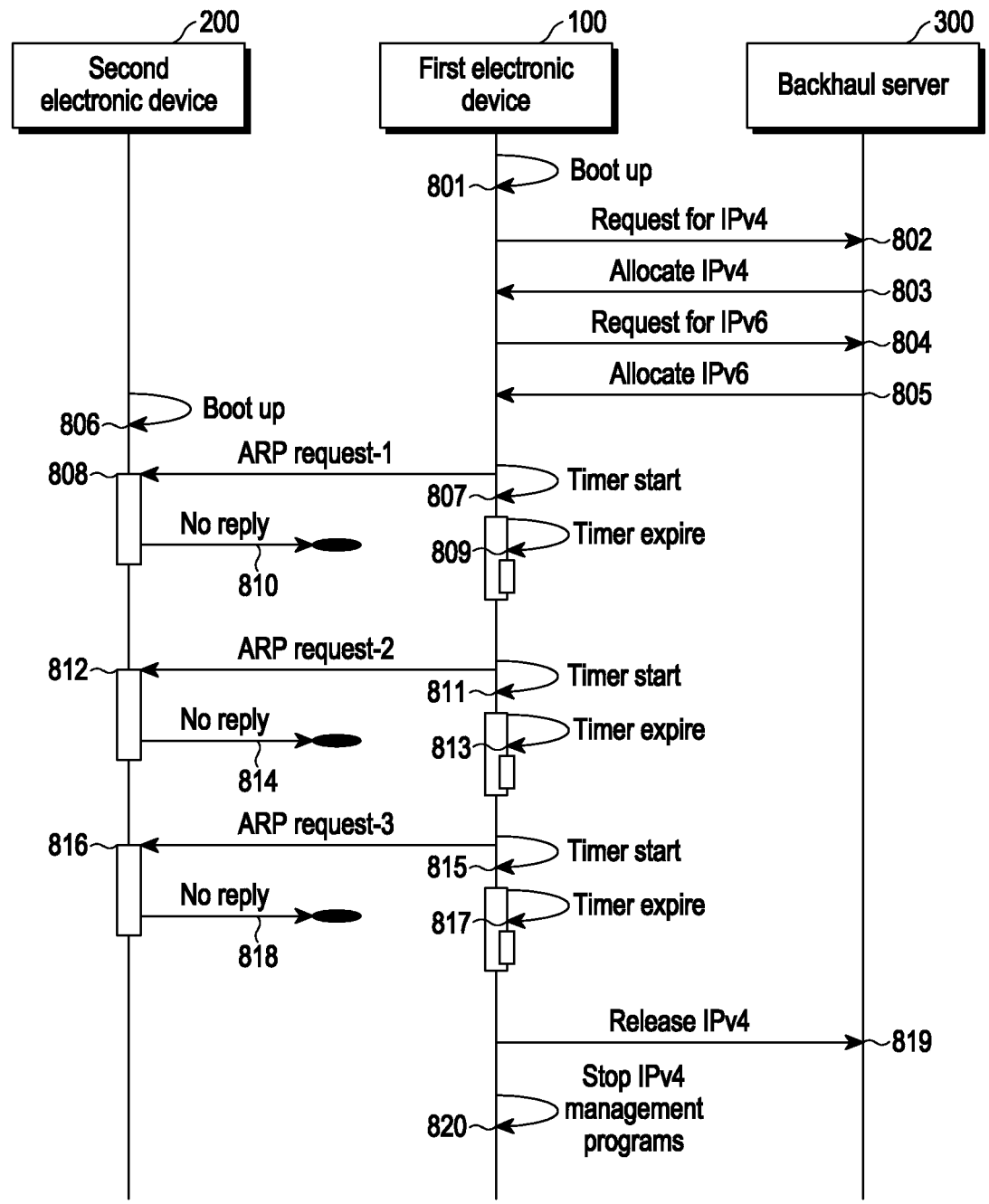
FIGS. 8A and 8B are signal flow diagrams illustrating various example operations for orchestrating the different versions of the IP address between the backhaul server and the second electronic device using the timer mechanism when the IPv4 address is manually enabled by the user of the second electronic device, according to various embodiments.
Figure 8B:
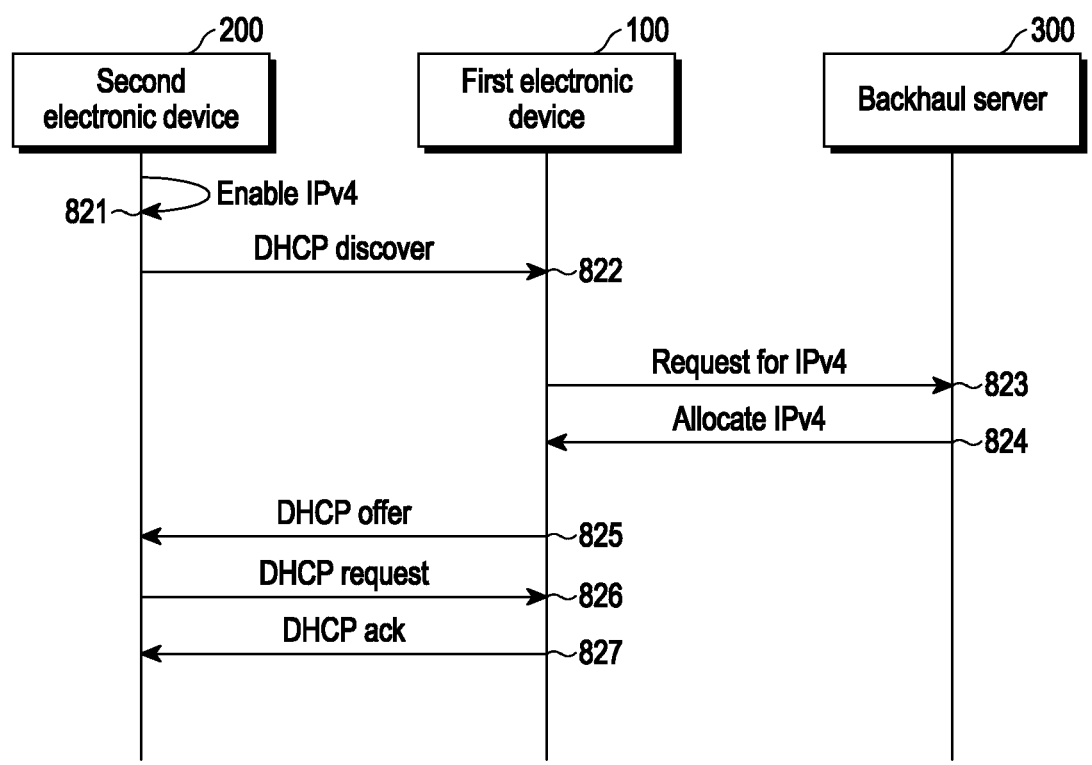

FIGS. 8A and 8B are signal flow diagrams illustrating various operations for orchestrating the different versions of the IP address between the backhaul server (300) and the second electronic device (200) using the timer mechanism when the IPv4 address is manually enabled by the user of the second electronic device (200), according to various embodiments.

At 801-802, when the first electronic device (100) detects boot up, the first electronic device (100) sends a request for the IPv4 address to the backhaul server (300). At 803, the backhaul server (300) allocates the IPv4 address to the first electronic device (100) upon receiving the request for the IPv4 address. At 804, the first electronic device (100) sends a request for the IPv6 address to the backhaul server (300). At 805, the backhaul server (300) allocates the IPv6 address to the first electronic device (100) upon receiving the request for the IPv6 address.

At 806, the first electronic device (100) detects a boot up associated with the second electronic device (200). At 807-808, when the first electronic device (100) needs to know the physical addresses of the second electronic device (200), the first electronic device (100) broadcasts the ARP request packet (e.g., ARP request-1) to the second electronic device (200), initiates the response timer (141*d*), and increments a value of the retry count (V4) (in this case the retry count (V4) value is 1) in response to sending the ARP request packet. At 809-810, the first electronic device (100) detects that the IPv4 address does not support by the second electronic device (200) and/or does not enable on the second electronic device (200) as the first electronic device (100) does not receive the ARP reply packet (no reply) from the second electronic device (200) before expiry of the response timer (141*d*). The probe (141) of the first electronic device (100) then increments the retry count (V4) in the host status database (110*a*), where the retry count (V4) indicates how many failed attempts to the second electronic device (200) were made before receiving the ARP reply packet.

At 811-812, the first electronic device (100) determines whether the retry count (V4) is within the threshold value (e.g., 3) (in this case the retry count (V4) value is 2, which is within the threshold value). The first electronic device (100). The first electronic device (100) then sends an ARP request packet (e., ARP request-2) to the second electronic device (200) and initiates the response timer (141*d*) in response to sending the ARP request packet. At 813-814, the first electronic device (100) detects that the IPv4 address does not support by the second electronic device (200) and/or does not enable on the second electronic device (200) as the first electronic device (100) does not receive the ARP reply packet (no reply) from the second electronic device (200) before expiry of the response timer (141*d*). The probe (141) of the first electronic device (100) then increments the retry count (V4) in the host status database (110*a*).

At 815-816, the first electronic device (100) determines whether the retry count (V4) is within the threshold value (e.g., 3) (in this case the retry count (V4) value is 3, which is within the threshold value). The first electronic device (100). The first electronic device (100) then sends an ARP request packet (e.g., ARP request-3) to the second electronic device (200) and initiates the response timer (141*d*) in response to sending the ARP request packet. At 817-818, the first electronic device (100) detects that the IPv4 address does not support by the second electronic device (200) and/or does not enable on the second electronic device (200) as the first electronic device (100) does not receive the ARP reply packet (no reply) from the second electronic device (200) before expiry of the response timer (141*d*). The probe (141) of the first electronic device (100) then increments the retry count (V4) in the host status database (110*a*).

At 819, the first electronic device (100) determines whether the retry count (V4) is within the threshold value (e.g., 3) (in this case the retry count (V4) value is 4, which is greater than the threshold value). As a result, the first electronic device (100) detects that the IPv4 address does not support by the second electronic device (200) and/or does not enable on the second electronic device (200). The first electronic device (100) then releases the allocated IPv4 address and sends the released IPv4 address to the backhaul server (300). At 820, the first electronic device (100) terminates IP management, which is associated with the IPv4 address.

At 821, the IPv4 address is manually enabled by the user of the second electronic device (200). At 822, the second electronic device (200) to get DHCP information broadcasts a DHCP discover on a network/towards the first electronic device (100). At 823, the first electronic device (100) sends a request for the IPv4 address to the backhaul server (300) upon receiving the DHCP discover. At 824, the backhaul server (300) allocates the IPv4 address to the first electronic device (100).

At 825, the first electronic device (100) responds with the DHCP offer packet containing potential configuration parameters. At 826, if the second electronic device (200) accepts offered parameters (potential configuration parameters), the second electronic device (200) sends the DHCP request packet indicating the allocation of offered parameters. At 827, finally, the first electronic device (100) allocates parameters and sends the DHCP ack to the second electronic device (200).

Figure 9A:
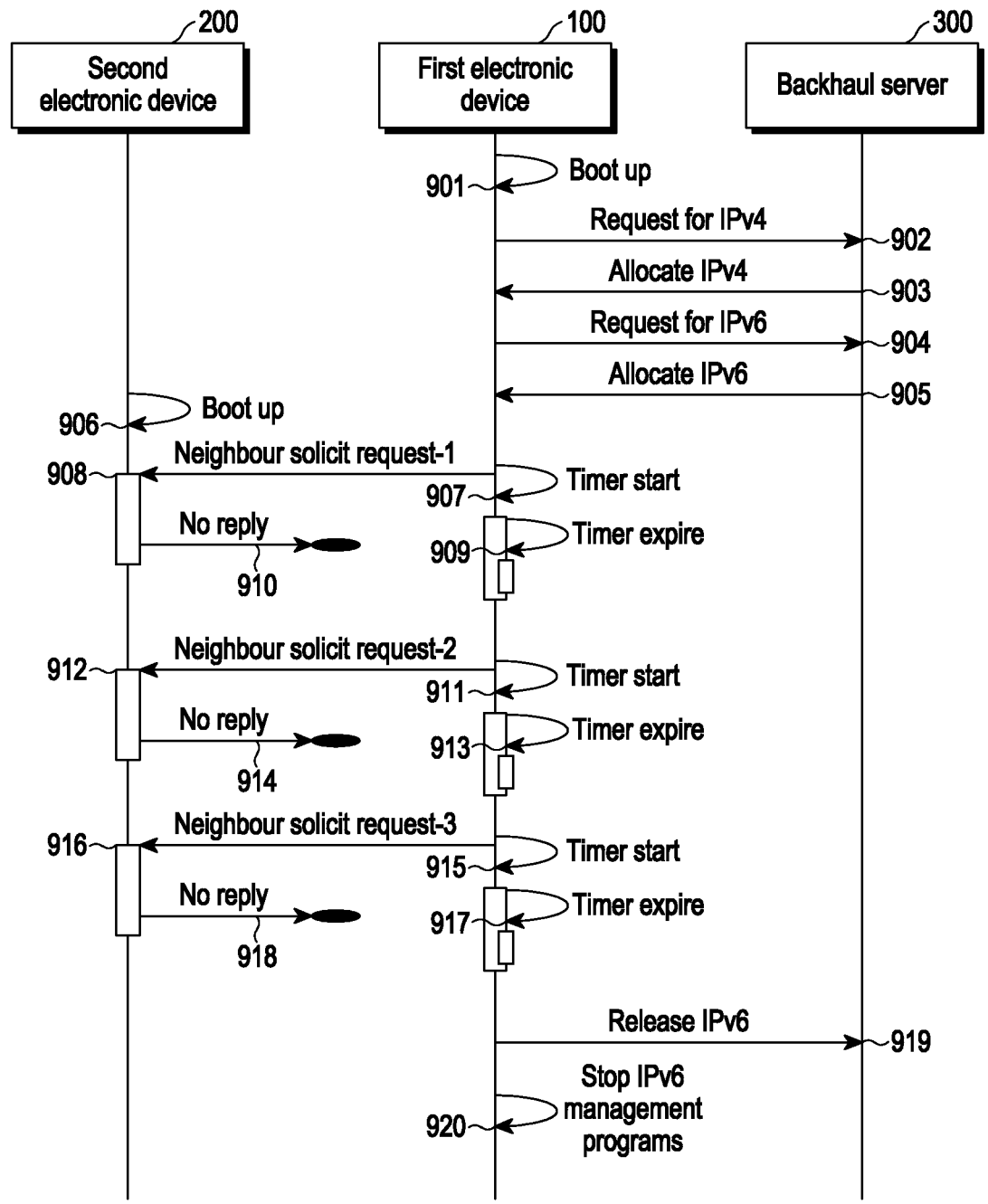
FIGS. 9A and 9B is are signal flow diagrams illustrating various example operations for orchestrating the different versions of the IP address between the backhaul server and the second electronic device using the timer mechanism when the IPv6 address is manually enabled by the user of the second electronic device, according to various embodiments.
Figure 9B:
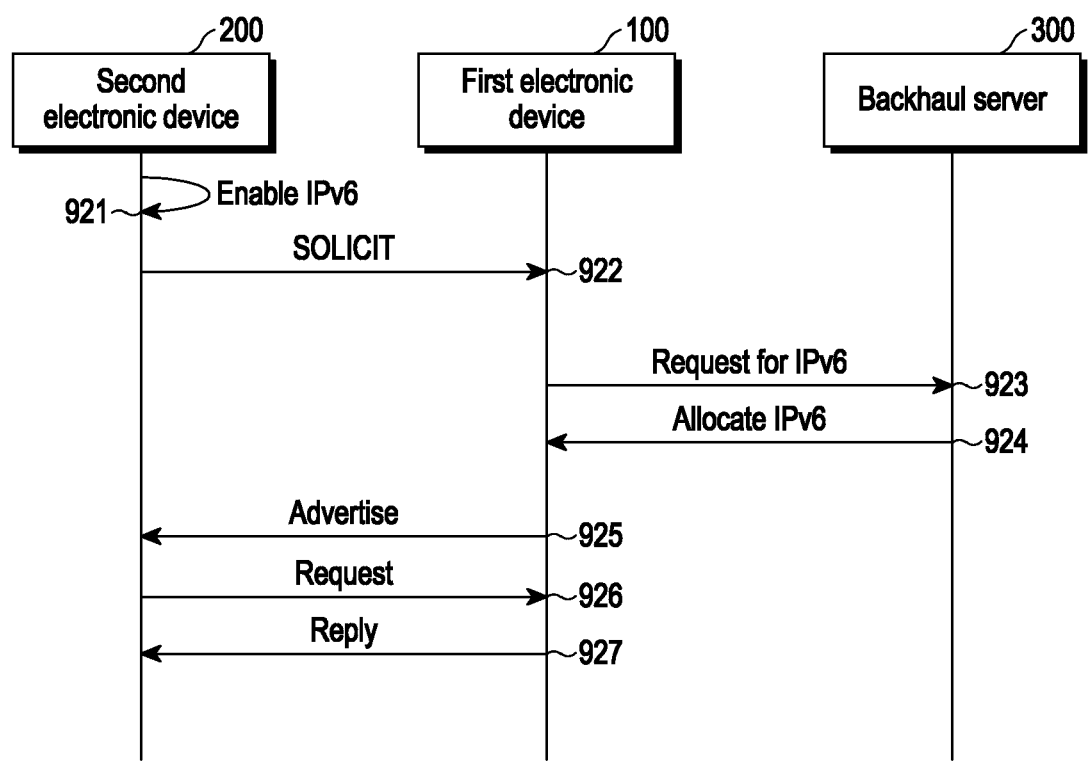

FIGS. 9A and 9B are signal flow diagrams illustrating various example operations for orchestrating the different versions of the IP address between the backhaul server (300) and the second electronic device (200) using the timer mechanism when the IPv6 address is manually enabled by the user of the second electronic device (200), according to various embodiments.

At 901-902, when the first electronic device (100) detects boot up, the first electronic device (100) sends the request for the IPv4 address to the backhaul server (300). At 903, the backhaul server (300) allocates the IPv4 address to the first electronic device (100) upon receiving the request for the IPv4 address. At 904, the first electronic device (100) sends the request for the IPv6 address to the backhaul server (300). At 905, the backhaul server (300) allocates the IPv6 address to the first electronic device (100) upon receiving the request for the IPv6 address.

At 906, the first electronic device (100) detects a boot up associated with the second electronic device (200). At 907-908, when the first electronic device (100) needs to know the physical addresses of the second electronic device (200), the first electronic device (100) broadcasts a neighbour solicit request-1 to the second electronic device (200), initiates the response timer (141*d*), and increments a value of the retry count (V6) (in this case the retry count (V6) value is 1) in response to sending the neighbour solicit request-1. At 909-910, the first electronic device (100) detects that the IPv6 address does not support by the second electronic device (200) and/or does not enable on the second electronic device (200) as the first electronic device (100) does not receive the response (no reply) from the second electronic device (200) before expiry of the response timer (141*d*). The probe (141) of the first electronic device (100) then increments the retry count (V6) in the host status database (110*a*), where the retry count (V6) indicates how many failed attempts to the second electronic device (200) were made before receiving the response.

At 911-912, the first electronic device (100) determines whether the retry count (V6) is within the threshold value (e.g., 3) (in this case the retry count (V6) value is 2, which is within the threshold value). The first electronic device (100). The first electronic device (100) then sends a neighbour solicit request-2 to the second electronic device (200) and initiates the response timer (141*d*) in response to sending the neighbour solicit request-2. At 913-914, the first electronic device (100) detects that the IPv6 address does not support by the second electronic device (200) and/or does not enable on the second electronic device (200) as the first electronic device (100) does not receive the response (no reply) from the second electronic device (200) before expiry of the response timer (141*d*). The probe (141) of the first electronic device (100) then increments the retry count (V6) in the host status database (110*a*).

At 915-916, the first electronic device (100) determines whether the retry count (V6) is within the threshold value (e.g., 3) (in this case the retry count (V6) value is 3, which is within the threshold value). The first electronic device (100). The first electronic device (100) then sends a neighbour solicit request-3 to the second electronic device (200) and initiates the response timer (141*d*) in response to sending the neighbour solicit request-3. At 917-918, the first electronic device (100) detects that the IPv6 address does not support by the second electronic device (200) and/or does not enable on the second electronic device (200) as the first electronic device (100) does not receive the response (no reply) from the second electronic device (200) before expiry of the response timer (141*d*). The probe (141) of the first electronic device (100) then increments the retry count (V6) in the host status database (110*a*).

At 919, the first electronic device (100) determines whether the retry count (V6) is within the threshold value (e.g., 3) (in this case the retry count (V6) value is 4, which is greater than the threshold value). As a result, the first electronic device (100) detects that the IPv6 address does not support by the second electronic device (200) and/or does not enable on the second electronic device (200). The first electronic device (100) then releases the allocated IPv6 address and sends the released IPv6 address to the backhaul server (300). At 920, the first electronic device (100) terminates IP management, which is associated with the IPv6 address.

At 921, the IPv6 address is manually enabled by the user of the second electronic device (200). At 922, the second electronic device (200) sends a SOLICIT packet to a well-known multicast address. Any intermediate routers forward the packet to the first electronic device (100) (any running DHCPv6 server) on the network. At 923, the first electronic device (100) sends the request for the IPv6 address to the backhaul server (300) upon receiving the DHCP discover. At 924, the backhaul server (300) allocates the IPv6 address to the first electronic device (100).

At 925, the first electronic device (100) responds with the advertise packet indicating its availability for DHCP service. At 926, the second electronic device (200) sends a request packet to the first electronic device (100) (e.g., DHCPv6 server) for the IP address and other configuration parameters. At 927, finally, the first electronic device (100) responds with a reply message.

The embodiments disclosed herein can be implemented using at least one hardware device and performing network management functions to control the elements.

While the disclosure is illustrated with reference to various example embodiments, it will be understood that the various example embodiments are intended to be illustrative, not limiting. It will be further understood by those skilled in the art the various changes in form and detail may be made without departing from the true spirit and full scope of the disclosure, including the appended claims and their equivalents. It will also be understood that any of the embodiment(s) described herein may be used in conjunction with any other embodiments(s) described herein.

What is claimed is:

1. A method for device internet protocol (IP) status checking and connection orchestration by a first electronic device including a consumer premises equipment (CPE), the method comprising:
   determining an IP stack capability status of at least one second electronic device which is accessible to the first electronic device as an access point, using at least one network protocol, wherein the IP stack capability status indicates whether a first version of an IP address is supported by the at least one second electronic device and the first version of the IP address is enabled on the at least one second electronic device;
   storing the determined IP stack capability status of the at least one second electronic device;
   acquiring the first version of the IP address from a backhaul server to communicate with the at least one second electronic device based on the first version of the IP address being supported by the at least one second electronic device and the first version of the IP address being enabled on the at least one second electronic device;
   terminating IP management associated with a second version of the IP address based on the second version of the IP address not being supported by the at least one second electronic device and the second version of the IP address not being enabled on the at least one second electronic device,
   wherein terminating the IP management associated with the second version of the IP address comprises stopping at least one program which manages the second version of the IP address and is running on the first electronic device; and
   releasing the second version of the IP address and sending the second released version of the IP address to the backhaul server based on the second version of the IP address not being supported by the at least one second electronic device and the second version of the IP address not being enabled on the at least one second electronic device.

2. The method of claim 1, wherein the IP stack capability status of the at least one second electronic device is stored in a host status database of the first electronic device using at least one table.

3. The method of claim 1, wherein the at least one version of the IP address comprises at least one of an Internet Protocol version 4 (IPv4) address and an Internet Protocol version 6 (IPv6) address and the host status database stores the IPv4 address, the IPv6 address, link layer addresses, a v4 retry count, a v6 retry count, a network v4 status, and a network v6 status.

4. The method of claim 1, wherein the at least one network protocol comprises: at least one of an Address Resolution Protocol (ARP) and a Dynamic Host Configuration Protocol (DHCP) for the IPv4 address, a Neighbour Discovery Protocol (NDP), and a Dynamic Host Configuration Protocol version 6 (DHCPv6).

5. The method of claim 1, wherein determining the IP stack capability status of the at least one second electronic device using the at least one network protocol, comprises:
   sending at least one packet associated with the IPV4 address to the at least one second electronic device;
   initiating a v4 retry count in response to sending the at least one packet to the at least one second electronic device;
   initiating a timer in response to sending the at least one packet to the at least one second electronic device;
   determining whether a response of the at least one packet is received from the at least one second electronic device before the timer expires and whether the v4 retry count is within a threshold limit;
   performing at least one of:
      detecting that the IPv4 address is supported by the at least one second electronic device and the IPv4 address is enabled on the at least one second electronic device in response to determining that the response of the at least one packet is received from the at least one second electronic device before the timer expires and the v4 retry count is within the threshold limit, or
      detecting that the IPv4 address is not supported by the at least one second electronic device and the IPv4 address is not enabled on the at least one second electronic device in response to determining that the response of the at least one packet is received from the at least one second electronic device after the timer expires and the v4 retry count crosses the threshold limit; or
      detecting that the IPv4 address is not supported by the at least one second electronic device and the IPv4 address is not enabled on the at least one second electronic device in response to determining that the response of the at least one packet is not received from the at least one second electronic device before the timer expires and the v4 retry count crosses the threshold limit.

6. The method of claim 1, further comprising:
   receiving at least one packet associated with an IPv4 address from the at least one second electronic device;
   receiving an IPv4 address disable indication from the at least one second electronic device, wherein the IPv4 address is manually disabled;
   releasing the IPv4 address upon receiving the IPv4 address disable indication; and
   sending the released IPv4 address to a backhaul server to terminate IP management associated with the released IPv4 address.

7. The method of claim 1, wherein determining the IP stack capability status of the at least one second electronic device using the at least one network protocol comprises:
   sending at least one packet associated with the IPv6 address to the at least one second electronic device;
   initiating a v6 retry count in response to sending the at least one packet to the at least one second electronic device;
   initiating a timer in response to sending the at least one packet to the at least one second electronic device;

determining whether a response of the at least one packet is received from the at least one second electronic device before the timer expires and whether the v6 retry count is within a threshold limit;

performing at least one of:

detecting that the IPv6 address is supported by the at least one second electronic device and the IPv6 address is enabled on the at least one second electronic device in response to determining that the response of the at least one packet is received from the at least one second electronic device before the timer expires and the v6 retry count is within the threshold limit; or detecting that the IPv6 address is not supported by the at least one second electronic device and the IPv6 address is not enabled on the at least one second electronic device in response to determining that the response of the at least one packet is received from the at least one second electronic device after the timer expires and the v6 retry count crosses the threshold limit; or detecting that the IPv6 address is not supported by the at least one second electronic device and the IPv6 address is not enabled on the at least one second electronic device in response to determining that the response of the at least one packet is not received from the at least one second electronic device before the timer expires and the v6 retry count crosses the threshold limit.

8. The method of claim 1, further comprising:
receiving at least one packet associated with an IPv6 address from the at least one second electronic device;
receiving an IPv6 address disable indication from the at least one second electronic device, wherein the IPv6 address is manually disabled;
releasing the IPv6 address upon receiving the IPv6 address disable indication; and
sending the released IPv6 address to a backhaul server to terminate IP management associated with the released IPv6 address.

9. The method of claim 1, further comprising:
receiving an IPv4 address enable indication from the at least one second electronic device, wherein the IPv4 address is manually enabled;
sending an IPv4 address allocation request to a backhaul server upon receiving the IPv4 address enable indication;
receiving an IPv4 address from the backhaul server; and
allocating the received IPv4 address to the at least one second electronic device.

10. The method of claim 1, further comprising:
receiving an IPv6 address enable indication from the at least one second electronic device, wherein the IPv6 address is manually enabled;
sending an IPv6 address allocation request to a backhaul server upon receiving the IPv6 address enable indication;
receiving an IPv6 address from the backhaul server; and
allocating the received IPv6 address to the at least one second electronic device.

11. A first electronic device including a consumer premises equipment (CPE) for device internet protocol (IP) status checking and connection orchestration, the first electronic device comprising:

memory storing instructions; and
at least one processor coupled to the memory, wherein the instructions, when executed by the at least one processor, cause the first electronic device to:

determine an IP stack capability status of at least one second electronic device which is accessible to the first electronic device as an access point, using at least one network protocol, wherein the IP stack capability status indicates whether a first version of an IP address is supported by the at least one second electronic device and the first version of the IP address is enabled on the at least one second electronic device;

store the determined IP stack capability status of the at least one second electronic device;

acquire the first version of the IP address from a backhaul server to communicate with the at least one second electronic device based on the first version of the IP address being supported by the at least one second electronic device and the first version of the IP address being enabled on the at least one second electronic device; and terminate IP management associated with the a second version of the IP address based on the stored IP stack capability status of the at least one second electronic device indicating that the second version of the IP address not being supported by the at least one second electronic device and that the second version of the IP address not being enabled on the at least one second electronic device, wherein to terminate IP management associated with the second version of the IP address, the instructions, when executed by the at least one processor, cause the first electronic device to stop at least one program which manages the second version of the IP address, running on the first electronic device, and release the second version of the IP address and sending the second released version of the IP address to the backhaul server based on the second version of the IP address not being supported by the at least one second electronic device and the second version of the IP address not being enabled on the at least one second electronic device.

12. The first electronic device of claim 11, wherein for determining the IP stack capability status of the at least one second electronic device using the at least one network protocol, the instructions, when executed by the at least one processor, cause the first electronic device to:

send at least one packet associated with the IPv4 address to the at least one second electronic device;
  initiate a v4 retry count in response to sending the at least one packet to the at least one second electronic device;
  initiate a timer in response to sending the at least one packet to the at least one second electronic device;
  determine whether a response of the at least one packet is received from the at least one second electronic device before the timer expires and whether the v4 retry count is within a threshold limit;
  perform at least one of:
    detecting that the IPv4 address is supported by the at least one second electronic device and the IPv4 address is enabled on the at least one second electronic device in response to determining that the response of the at least one packet is received from the at least one second electronic device before the timer expires and the v4 retry count is within the threshold limit; or detecting that the IPv4 address is not supported by the at least one second electronic device and the IPv4 address is not enabled on the at least one second electronic device in response to determining that the response of the at least one packet is received from the at least one second electronic device after the timer expires and the v4 retry count crosses the threshold limit; or detecting that the IPv4 address is not supported by the at least one second electronic device and the IPv4 address is not enabled on the at least one second electronic device in response to determining that the response of the at least one packet is not received from the at least one second electronic device before the timer expires and the v4 retry count crosses the threshold limit.

13. The first electronic device of claim 11, wherein the instructions, when executed by the at least one processor, cause the first electronic device to:

receive at least one packet associated with an IPv4 address from the at least one second electronic device;

receive an IPv4 address disable indication from the at least one second electronic device, wherein the IPv4 address is manually disabled;

release the IPv4 address upon receiving the IPv4 address disable indication; and send the released IPv4 address to a backhaul server to terminate IP management associated with the released IPv4 address.

14. The first electronic device of claim 11, wherein for determining the IP stack capability status of the at least one second electronic device using the at least one network protocol, the instructions, when executed by the at least one processor, cause the first electronic device to:

send at least one packet associated with the IPv6 address to the at least one second electronic device;

initiate a v6 retry count in response to sending the at least one packet to the at least one second electronic device;

initiate a timer in response to sending the at least one packet to the at least one second electronic device;

determine whether a response of the at least one packet is received from the at least one second electronic device before the timer expires and whether the v6 retry count is within a threshold limit;

perform at least one of:
  detecting that the IPv6 address is supported by the at least one second electronic device and the IPv6 address is enabled on the at least one second electronic device in response to determining that the response of the at least one packet is received from the at least one second electronic device before the timer expires and the v6 retry count is within the threshold limit; or detecting that the IPv6 address is not supported by the at least one second electronic device and the IPv6 address is not enabled on the at least one second electronic device in response to determining that the response of the at least one packet is received from the at least one second electronic device after the timer expires and the v6 retry count crosses the threshold limit; or detecting that the IPv6 address is not supported by the at least one second electronic device and the IPv6 address is not enabled on the at least one second electronic device in response to determining that the response of the at least one packet is not received from the at least one second electronic device before the timer expires and the v6 retry count crosses the threshold limit.

15. The first electronic device of claim 11, wherein the instructions, when executed by the at least one processor, cause the first electronic device to:

receive at least one packet associated with an IPv6 address from the at least one second electronic device;

receive an IPv6 address disable indication from the at least one second electronic device, wherein the IPv6 address is manually disabled;

release the IPv6 address upon receiving the IPv6 address disable indication; and send the released IPv6 address to a backhaul server to terminate IP management associated with the released IPv6 address.

* * * * *